United States Patent
Srinivasan

(10) Patent No.: US 10,289,189 B2
(45) Date of Patent: May 14, 2019

(54) USAGE PATTERN BASED SUPERVISORY CONTROL OF POWER MANAGEMENT

(71) Applicant: Microsoft Technology Licensing, LLC, Redmond, WA (US)

(72) Inventor: Harish Srinivasan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 15/441,693

(22) Filed: Feb. 24, 2017

(65) Prior Publication Data

US 2018/0120923 A1    May 3, 2018

Related U.S. Application Data

(60) Provisional application No. 62/415,228, filed on Oct. 31, 2016, provisional application No. 62/415,142, (Continued)

(51) Int. Cl.
*G06F 1/00* (2006.01)
*G06F 1/3287* (2019.01)
(Continued)

(52) U.S. Cl.
CPC ............ *G06F 1/3287* (2013.01); *G06F 1/266* (2013.01); *G06F 1/3203* (2013.01);
(Continued)

(58) Field of Classification Search
CPC .... G06F 1/3287; G06F 1/3296; G06F 1/3203; G06F 11/3051; G06F 1/266; G06F 1/3234; G06F 1/3209; G06F 11/3048
See application file for complete search history.

(56) References Cited

U.S. PATENT DOCUMENTS

| 5,825,674 A | 10/1998 | Jackson |
| 6,105,142 A | 8/2000 | Goff et al. |

(Continued)

FOREIGN PATENT DOCUMENTS

| TW | 200950409 A | 12/2009 |
| WO | 2013085539 A1 | 6/2013 |
| WO | 2015099700 A1 | 7/2015 |

OTHER PUBLICATIONS

Chatterjee, et al., "Exploring Adaptive Power Saving Schemes for Mobile VoIP Devices in IEEE 802.11 Networks", In Proceedings of Second International Conference on Digital Telecommunications, Jul. 1, 2007, 7 pages.

(Continued)

*Primary Examiner* — Xuxing Chen
(74) *Attorney, Agent, or Firm* — Holzer Patel Drennan

(57) ABSTRACT

A supervisory control system provides power management in an electronic device by providing timeout periods for a hardware component to lower levels of the operating system such as a power management arbitrator and/or a hardware interface controller. The timeout periods are chosen based on usage patterns detected on the electronic device and based on user preference information. The power management arbitrator and/or hardware interface controller transition at least a portion of a hardware component to a lower-power state based on monitored activity information of the hardware component. The supervisory control system may further provide wakeup periods to the power management arbitrator and/or a hardware interface controller to determine whether the hardware component should be transitioned to a higher power state at the end of the wakeup period if the hardware component satisfies a transition condition.

21 Claims, 11 Drawing Sheets

Related U.S. Application Data filed on Oct. 31, 2016, provisional application No. 62/415,183, filed on Oct. 31, 2016.

(51) Int. Cl.
| | |
|---|---|
| *G06F 1/26* | (2006.01) |
| *G06F 1/3209* | (2019.01) |
| *G06F 1/3234* | (2019.01) |
| *G06F 11/30* | (2006.01) |
| *G06F 1/3203* | (2019.01) |
| *G06F 1/3296* | (2019.01) |
| *G06F 1/3228* | (2019.01) |

(52) U.S. Cl.
CPC .......... *G06F 1/3209* (2013.01); *G06F 1/3228* (2013.01); *G06F 1/3234* (2013.01); *G06F 1/3278* (2013.01); *G06F 1/3296* (2013.01); *G06F 11/3048* (2013.01); *G06F 11/3051* (2013.01); *Y02D 10/157* (2018.01); *Y02D 10/171* (2018.01); *Y02D 10/172* (2018.01); *Y02D 50/20* (2018.01)

(56) References Cited

U.S. PATENT DOCUMENTS

| | | |
|---|---|---|
| 6,654,895 B1 | 11/2003 | Henkhaus et al. |
| 8,627,125 B2 | 1/2014 | Kashyap |
| 8,738,950 B2 | 5/2014 | Cooper et al. |
| 8,892,710 B2 | 11/2014 | Gatta et al. |
| 9,442,554 B1 | 9/2016 | Arscott et al. |
| 2003/0210658 A1 | 11/2003 | Hernandez et al. |
| 2004/0003300 A1 | 1/2004 | Malueg et al. |
| 2004/0153676 A1 | 8/2004 | Krantz et al. |
| 2005/0190714 A1 | 9/2005 | Gorbatov et al. |
| 2008/0005381 A1 | 1/2008 | Theocharous et al. |
| 2008/0101230 A1 | 5/2008 | Liu et al. |
| 2008/0307243 A1 | 12/2008 | Lee |
| 2009/0052372 A1 | 2/2009 | Durazzo et al. |
| 2009/0063878 A1 | 3/2009 | Schmidt et al. |
| 2009/0287948 A1 | 11/2009 | Chary |
| 2010/0077234 A1 | 3/2010 | Das |
| 2010/0100755 A1 | 4/2010 | Lin et al. |
| 2010/0162013 A1 | 6/2010 | Oh et al. |
| 2010/0169684 A1 | 7/2010 | Jeyaseelan et al. |
| 2011/0039508 A1 | 2/2011 | Lindahl et al. |
| 2011/0055399 A1 | 3/2011 | Tung et al. |
| 2011/0069649 A1 | 3/2011 | Gobriel et al. |
| 2011/0078475 A1 | 3/2011 | Juenemann et al. |
| 2011/0176463 A1 | 7/2011 | Cowan et al. |
| 2011/0185200 A1 | 7/2011 | Sim et al. |
| 2011/0252252 A1 | 10/2011 | Ramakrishnan et al. |
| 2012/0076011 A1 | 3/2012 | Gobriel et al. |
| 2012/0123984 A1 | 5/2012 | Nagpal et al. |
| 2012/0311361 A1 | 12/2012 | Locker et al. |
| 2013/0283073 A1* | 10/2013 | Jeganathan ........... G06F 1/3234 713/320 |
| 2014/0064134 A1 | 3/2014 | Huang et al. |
| 2014/0105084 A1 | 4/2014 | Chhabra et al. |
| 2014/0136869 A1 | 5/2014 | Sadowski et al. |
| 2014/0157026 A1 | 6/2014 | So et al. |
| 2014/0173298 A1 | 6/2014 | Bircher et al. |
| 2014/0181552 A1 | 6/2014 | Andreoli et al. |
| 2014/0211676 A1 | 7/2014 | Chhabra |
| 2015/0031326 A1 | 1/2015 | Begin et al. |
| 2015/0098374 A1 | 4/2015 | Homchaudhuri et al. |
| 2015/0121106 A1 | 4/2015 | Eckert et al. |
| 2016/0070332 A1* | 3/2016 | Viswanadham ....... G06F 1/3234 713/320 |
| 2016/0246341 A1 | 8/2016 | Burrell et al. |

OTHER PUBLICATIONS

Khan, et al., "Online learning of timeout policies for dynamic power management", In ACM Transactions on Embedded Computing Systems, vol. 13, Issue 4, Feb. 2014, 25 pages.

Information About Power Management Setting on a Network Adapter, https://support.microsoft.com/en-us/kb/2740020, Published on: Sep. 25, 2015, 5 pages.

"International Search Report and Written Opinion Issued in PCT Application No. PCT/US2017/057940", dated Jan. 24, 2018, 12 Pages.

International Search Report and Written Opinion Issued in PCT Application No. PCT/US2017/057941, dated Feb. 1, 2018,11 Pages.

International Search Report and Written Opinion Issued in PCT Application No. PCT/US2017/057942, dated Feb. 1, 2018, 11 Pages.

"Non Final Office Action Issued in U.S. Appl. No. 15/441,865", dated Jun. 27, 2018, 24 Pages.

"Non Final Office Action Issued in U.S. Appl. No. 15/441,778", dated Dec. 14, 2018, 7 Pages.

"Final Office Action Issued in U.S. Appl. No. 15/441,865", dated Jan. 29, 2019, 29 Pages.

* cited by examiner

USAGE PATTERN BASED SUPERVISORY CONTROL OF POWER MANAGEMENT

CROSS-REFERENCE TO RELATED APPLICATIONS

The present application claims benefit of priority to U.S. Provisional Patent Application No. 62/415,142, entitled "USAGE PATTERN INFLUENCE ON POWER MANAGEMENT" and filed on Oct. 31, 2016, U.S. Provisional Patent Application No. 62/415,183, entitled "DEVICE-AGGREGATING ADAPTIVE POWER MANAGEMENT" and filed on Oct. 31, 2016, and U.S. Provisional Patent Application No. 62/415,228, entitled "SUPERVISORY CONTROL OF POWER MANAGEMENT" and filed on Oct. 31, 2016, which are specifically incorporated by reference for all that they disclose and teach.

The present application is also related to U.S. patent application Ser. No. 15/441,778 entitled "AGGREGATED ELECTRONIC DEVICE POWER MANAGEMENT," and U.S. patent application Ser. No. 15/441,865, entitled "SUPERVISORY CONTROL OF POWER MANAGEMENT," both of which are filed concurrently herewith and are specifically incorporated by reference for all that they disclose and teach.

BACKGROUND

Power consumption management of the various system hardware components in a computing device, such as network adapters, display interfaces, input/output devices, cameras, etc., becomes more challenging as more computing devices become mobile and depend on battery power as a primary power source. Various modules in an operating system (OS) contribute to the management of power, such as deciding when a hardware component may transition to a low power mode. Applications and OS modules, however, can block system hardware components from going to low power. For example, some computing systems rely on applications to register their use of a system device when the device is needed by the application and release the device when the application no longer needs to use the device. This arrangement can block the hardware component from transitioning to low power mode, even for a brief period, when the device is not in use because applications often do not reliably register and release their requests to use the hardware component. Often the device could have transitioned to a lower power state, thus drawing less power from the battery than if the device had not transitioned to a low power state.

SUMMARY

The described technology provides usage pattern based supervisory control of power management in a computing device to determine when a system hardware component should transition to a low power state. An adaptive power management method includes receiving operational information of one or more applications executing on the electronic device, the one or more applications interacting with a hardware component of the electronic device, determining a usage pattern of the hardware component by the one or more applications based on the received operational information, setting a timeout period associated with the hardware component of the electronic device based on the determined usage pattern, the timeout period defining a minimum amount of time before a power state of the hardware component is permitted to be transitioned from a higher-power state to a lower-power state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Figure 1:
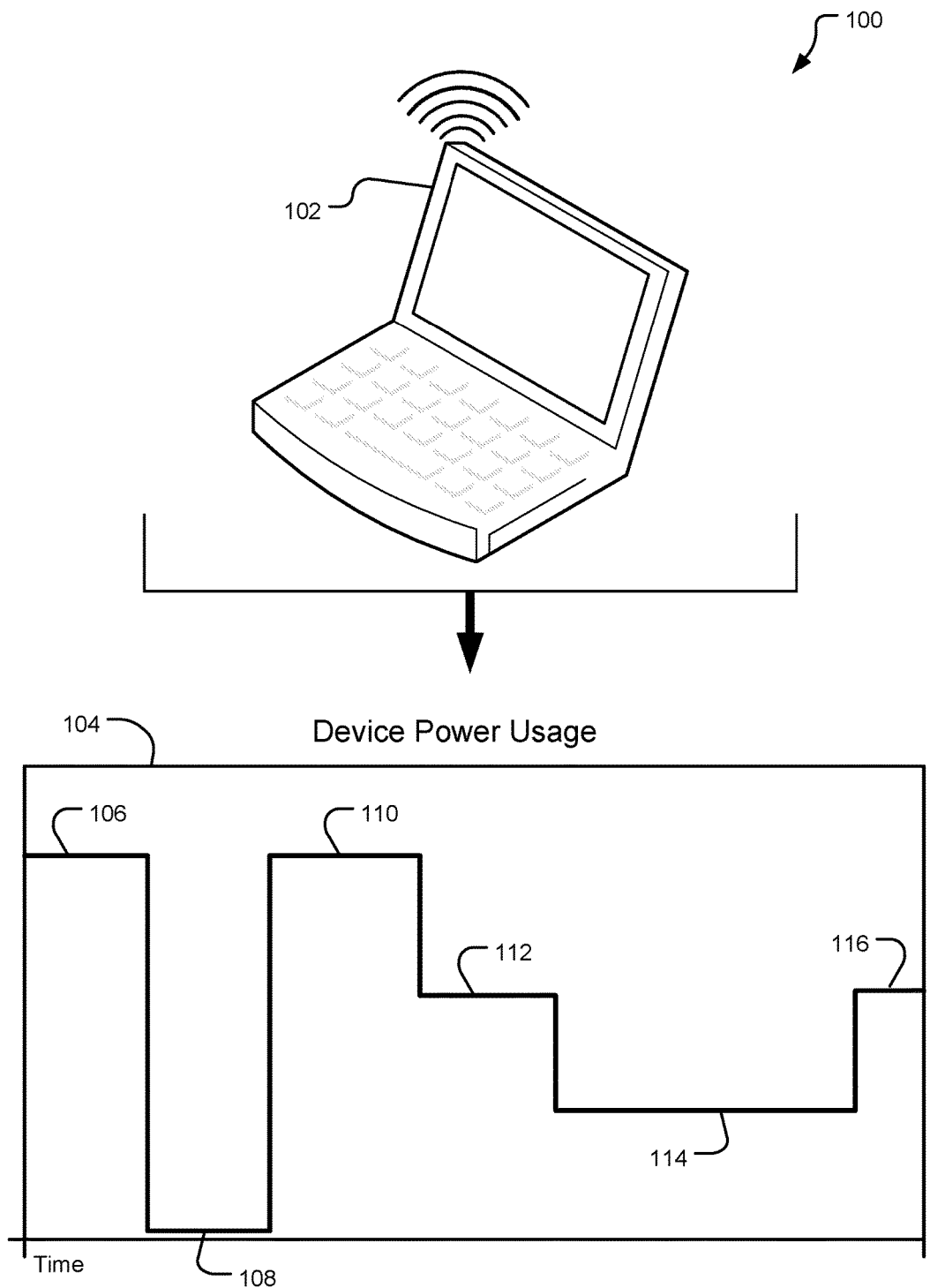
FIG. 1 illustrates an example environment for usage pattern based supervisory control of power management of a device with a power usage plot.

Under a system of usage pattern based supervisory control of power management, a usage pattern module performs functions including collecting information about the use of a hardware component (e.g., a network adapter, video adapter, input/output device, etc.) on an electronic device, identifying and classifying usage patterns associated with the electronic device and its hardware components, and setting power management parameters. The electronic device includes a power management supervisory controller and/or power management arbitrator to determine power management parameters (e.g., timeout periods, wakeup periods, power state transition targets, power consumption targets, etc.) based on usage patterns in the collected information. The power management arbitrator transitions a hardware component of the electronic device to a low power mode (or lower-power mode) according to the power management parameters after all applications have relinquished use of the system hardware component for the duration of a timeout period (e.g., transmitting or receiving network communications, displaying video, audio output, etc.) even if some applications are still registered to use the hardware component. By analyzing usage pattern information, including information expressed via user preferences, the usage pattern module is able to identify inefficient power management practices and/or areas of diminished user experience on the electronic device. The usage pattern module can improve power management by adjusting the power management parameters based on heuristics and/or user power management preferences.

Usage pattern based supervisory control improves power consumption and battery performance of an electronic device by transitioning hardware components to lower-power states more frequently than if the electronic device relied on applications to de-register their use of the hardware components. Usage pattern based supervisory control further improves power consumption and battery performance by transitioning hardware components to lower-power states using a lower-level of the OS on the electronic device, thereby reducing latency between power state transition decisions and the actual power transitions. Usage pattern based supervisory control takes into account user preferences such that transitions of hardware components to lower-power states is less likely to impair the user experience.

This disclosure describes the system and methods for effective supervisory power management on various system hardware components based on usage pattern detection. A result of the described technology is a refinement in power consumption by automating the reduction of system hardware component power consumption states during those periods when the system hardware component is not needed (e.g., transitioning a network adapter to a low power or lower-power state when network traffic is not actually flowing), even if only for a very brief period of time without relying on applications executing on the device to release their use of the hardware component by notifying the operation system.

Various examples are described below with respect to the figures. These examples are merely exemplary, and implementations of the present disclosure are not limited to the examples described below and illustrated in the figures.

FIG. 1 illustrates an example environment 100 for usage pattern based supervisory control of power management of a device 102 with a power usage plot 104. The device 102 is an electronic device with an OS and one or more system hardware components (not shown) that are capable of transitioning between one or more high power modes and low power modes. In at least some implementations, the one or more system hardware components of device 102 are capable of multiple power modes, including intermediate power modes between a high-power mode and a low power mode. For example, a system hardware component may have one or more on-board processors for that may be turned off in a low power mode, limited to a speed below full capacity in an intermediate power mode, and allowed to run at full speed in a high-power mode. As used herein, "power mode" and "power state" refer to the energy consumption of a system hardware component relative to the maximum amount of power the system hardware component is capable of consuming. Power states may be referred to as "higher power" and/or "lower power" states to indicate that a power state is higher or lower than another power state without necessarily implying that the power state is the highest or lowest power state that the system hardware component is capable of. Other implementations may include additional power modes to provide finer control over supervisory power management.

Device 102 includes a usage pattern module, a power management supervisory controller, and a power management arbitrator. The usage pattern module collects information regarding the use of hardware components on the electronic device 102 by one or more applications executing on the device 102 to identify and classify usage patterns based thereon. In an implementation, a usage pattern includes the use of an application or group of applications used in a pattern by a user. As one example of a usage pattern, a user may edit a locally stored document in a word processing application while listening to music on a streaming music application. Under this scenario, a hardware component (e.g., the network adapter) performs little to no network communication on behalf of the word processing application but receives network data to stream the next song on a playlist when the prior song starts playing. Such a usage pattern is characterized by bursts of network traffic punctuated by periods of network idle while playing a song but before the next song needs to be buffered. Accordingly, there are opportunities for the network adapter to enter a low-power (or lower-power) mode in the periods between streaming songs. The usage pattern module is configured to identify these opportunities when the user is in the word processing application and the music streaming application at the same time, and the usage profile of the hardware component (e.g., the network adapter) matches the corresponding network traffic profile.

When the usage pattern module has determined a current usage pattern, it communicates the determined pattern to a power management supervisory controller and/or power management arbitrator. In an implementation, the power management supervisory controller is associated with a higher level of the OS on the device 102, and the power management arbitrator is associated with a lower level of the OS on the device 102. The power management arbitrator may transition system hardware components between various power modes by controlling a hardware sublayer, a hardware driver, and/or a component of the data link layer of the OS associated with the hardware system device. In an implementation, the power management arbitrator need not communicate with the power management supervisory controller or other components of the OS on electronic device 102 to effect power state transitions of system hardware components.

The OS of device 102 manages the applications in the system that utilize system services, including, for example, network services, video display, audio output, etc. Network adapters will be a focus of the description herein, but the supervisory power management features described may apply to any other system hardware components as well. Hence, the OS is aware whether the network will be needed by monitoring applications and OS modules that depend on the network adapter. This management represents a supervisory state that the OS of device 102 can apply to individual network adapters, based on the need for each rather than relying on registration of application for the network adapters. As applications begin and end execution, the OS tracks the hardware component's overall network need, which network devices (or media) are needed, and the load status of the network devices. The OS of device 102 informs a component such as a low-level OS arbitrator, an NDIS API, and/or a miniport driver whether the network is needed by the applications. If the network is not needed, the network adapter is transitioned to low power.

When the OS of device 102 indicates that the network is needed by applications or services, the OS still does not know the actual network demand. The system applications and operating modules calling for network usage, therefore, benefit from a separation of higher-level components of the OS of device 102 from the low-level OS components such as the network adapter, arbitrator, etc. Accordingly, network adapter power management can be controlled at the lowest possible layer in the network stack. If the upper-level OS indicates that network services are not needed, the network adapter can be transitioned to low power. However, when the OS indicates that applications or services do require the network, it is still possible, or even likely, that there are periods where the network is not actually needed because applications often register with the OS for control of a system hardware component even if it is not needed for periods of time by the application. During these periods of network inactivity, the network adapter can be transitioned to low power. Usually, these periods of inactivity are quite short, often several such periods per second. The sum of these inactive periods is typically larger than the periods of actual network use. Transitioning to low power for these periods saves a significant portion of power the network adapter would otherwise be using.

Decoupling the management of network power state and actual network adapter power state is controllable from both a system-wide and per-device basis. In devices that respond poorly to idle detection power transitions of system hardware components, a system-wide override will mitigate poor idle detections. Similarly, individual device manufacturers may deem it risky to allow the duty cycle of power transitions to negatively impact their devices. Other reasons also exist for not wanting a particular device to respond to idle detection power transitions.

Determining whether a system hardware component of device 102 is idle may be done per one or more algorithms that can be used separately or in various combinations. In one implementation, a fixed or variable timeout period may be used to determine whether a system hardware component is idle. In the example of a network device, the trigger to transition to a low power state is when the network is idle for a timeout period. Typically, the length of the timeout period is dependent on the latency of the network adapter startup and the power consumed during transitions versus steady state operation. For example, a system hardware component with a shorter startup time that consumes relatively little power when transitioning between a low power and a high-power state compared to remaining in a high-power state may weigh in favor of a shorter timeout period to avoid leaving the system hardware component in a high power state when it is not needed.

As used herein, an inactivity condition may refer to a level of activity of a hardware component that is zero, near-zero, or below a threshold level of activity. For example, a network adapter may satisfy an inactivity condition if it transmits or receives no packets to or from a host during a time period even if the network adapter is performing other functions such as running a timeout and/or wakeup timer, "listening" for certain types of packets, and/or communicating with a host. In some implementations, a network adapter may send or receive packets on behalf of a host during a timeout period and still satisfy the inactivity condition if the number and/or type of packets are below a threshold value.

As used herein, a transition condition may depend on a timeout period and the activity of a hardware component during that period. For example, a transition condition may be satisfied if an inactivity condition is satisfied during a timeout period. In some implementations, a transition condition may be satisfied if a hardware component satisfies an inactivity condition during a timeout period and there are no applications that have indicated a need to use the hardware component in a time period after the timeout period. In another implementation, a transition condition may be satisfied if a hardware component doesn't satisfy an inactivity condition during a timeout period but user preferences indicate an aggressive power saving preference wherein a hardware component should be deemed to have satisfied the transition condition if the hardware component's activity during the timeout period is below a predetermined level or if the hardware component's activity is of a certain type during the timeout period. In another implementation, a transition condition is satisfied when there is no monitored activity information during the timeout period, and the hardware component is idle at the end of the timeout period. In another implementation, a transition condition is satisfied when the hardware component has a maximum amount of activity during the timeout period. Other elements of the transition condition may also be used.

In another implementation, a fixed or variable wakeup period may be used to determine whether a system hardware component of device 102 that has been in a low-power state may be transitioned to a high-power state or to re-check whether operating conditions have changed sufficiently to justify a transition to a high power state. The length of the wakeup period may be dependent on the latency of the network adapter startup and the power consumed during transition of the system hardware component compared to steady state operation. For example, a system hardware component with a longer startup time that consumes significantly more power when transitioning between a low power and high power state compared to remaining in a high power state may weigh in favor of a longer wakeup period to avoid excessively waking the device.

In another implementation, the length of the timeout period to trigger the transition of a system hardware component of device 102 (e.g., a network adapter) to a low power state when the network is idle and/or the length of the wakeup period to trigger the transition of the system hardware component from a low power state to a high-power state may be determined by the class/type of applications running on the device. For example, a video streaming application that burst short portions of network traffic may be optimized for different timeout periods and wakeup periods than an audio application that downloads one song at a time and then remains idle until the next song downloads. In at least one implementation, a low-level arbitrator may determine the relevant time periods without resort to high-levels of the operating system.

In another implementation, the length of the timeout period to trigger the transition of a system hardware component of device 102 (e.g., a network adapter) to a low power state when the network is idle and/or the length of the wakeup period to trigger the transition of the system hardware component from low power to a high-power state may be determined based on the durations of recent periods, in the case of a network adapter, of network transmission compared to periods of network idle. If a set of recent periods of network transmission are cached, then a weighted algorithm or a decaying value algorithm may be used to determine the length of upcoming expected periods of network transmission for which the system hardware component (e.g., the network adapter) should be in a high-power state.

In another implementation, the length of the timeout period to trigger the transition of a system hardware component (e.g., a network adapter) of device 102 to a low power state when the network is idle and/or the length of the wakeup period to trigger the transition of the system hardware component from low power to a high-power state may be determined based on an available battery state. As such, the length of the timeout and/or wakeup periods may become more aggressive as the remaining battery power declines. The aggressiveness of the lengths of the timeout period and wakeup period is limited by the baseline power consumed by transitions.

In another implementation, the length of the timeout period to trigger the transition of a system hardware component (e.g., a network adapter) of device 102 to a low power state when the network is idle and/or the length of the wakeup period to trigger the transition of the system hardware component from low power to a high-power state may be determined based on feedback from a system hardware component. In the case of a network adapter, the responsiveness of the network adapter to transitions between low power and high power states and the power consumer by the network adapter in transitioning between those states may be communicated through the network driver to the OS to determine an optimal length of time for the timeout period and/or the wakeup period.

In another implementation, the length of the timeout period to trigger the transition of a system hardware component (e.g., a network adapter) of device 102 to a low power state when the network is idle and/or the length of the wakeup period to trigger the transition of the system hardware component from low power to a high-power state may be determined based on user input. An OS may allow the user to input information to the OS regarding the nature of the length of the timeout period to be used. If the available battery power of the device reaches a threshold, the OS may present a user interface to the user to collect a "hint" from the user regarding the user's power management preferences. For example, if a user wishes for a system hardware component to have good performance, the user may select a less aggressive timeout and/or wakeup period to preserve performance at the cost of remaining battery life. On the other hand, a user may select a more aggressive timeout and/or wakeup period if the user wishes to maximize battery life at the cost of performance due to more frequent transitions between high and low power states of a system hardware component.

In another implementation, the length of the timeout period to trigger the transition of a system hardware component (e.g., a network adapter) of device 102 to a low power state when the network is idle and/or the length of the wakeup period to trigger the transition of the system hardware component from low power to a high-power state may be determined based on the input of an arbiter. The power management arbitrator is a low-level OS module that determines the contribution and effect of the various available algorithms for determining the length of the timeout and/or wakeup periods.

In another implementation, the length of the timeout period to trigger the transition of a system hardware component (e.g., a network adapter) of device 102 to a low power state when the network is idle and/or the length of the wakeup period to trigger the transition of the system hardware component from low power to a high-power state may be determined based on application type usage and/or the state of the application. If an application has registered with the OS to use the system hardware component, then the timeout period may be set based on the expected needs of the application with respect to the system hardware component. For example, if a multi-player online game application has registered with the OS to use the network adapter, then a longer timeout period may be set because network latency in an online gaming application is likely to degrade the user experience due to lag between the user and other players in the game. If the state of the online gaming application changes, however, then a longer timeout period may be more appropriate. For example, if the user becomes inactive in the game and appears to be taking a break from play, then the lag issue is not as important as when the player was actively engaged, and a longer timeout period may be acceptable. Other examples of application type and application state affecting the timeout and/or wakeup period include a video application that is displaying video at a requested frame rate to the user. If the video application is playing the video, it may be assumed that the user is watching the video and the video adapter should not be transitioned to a low power state. On the other hand, if the user pauses the video and/or selects the windows of other applications executing on the device (e.g., the video application window is partially or completely obscured by other windows), then a shorter timeout period may be appropriate. In an implementation, the video adapter has multiple intermediate power modes such that the video adapter may be transitioned into an intermediate power state to support video applications that do not demand a high frame rate.

Implementations of the present application include a network power module, which may be part of a power management arbitrator, integrated within an operating system of device 102, which controls the use of networking hardware during various power states of a device. Applications register with the network power module. The network power module accesses a policy store to determine a priority of the application. The application's priority may be static or configurable. The network power module also determines a power state of the device, which may be defined in various ways without departing from the scope of implementations. The network power module—based on power state, application priority, or other factors such as remaining battery power, application state, device user interface (UI) state—enables the network communication hardware to be powered up to receive and transmit data.

In some implementations, the network power module sets a timer in certain power states—such as in high power states. The timer establishes a timeout period, which may be adaptable, during which the device and/or the network communication hardware remains powered up, and traffic may be sent. After the timeout timer expires, the device and/or the network communication hardware revert into a low power state. The arrival of additional high-priority traffic may cause a currently running timer to increase remaining time or to be reset, to give more time for the traffic to be transmitted. Low-priority traffic may be transmitted or received during the timer period. Low-priority traffic may be queued for transmission until the communication hardware is activated. In some implementations, lower-priority traffic may cause the network power module to activate the network communications hardware if a threshold amount of lower-priority traffic queues for transmission. The timeout period may be adjustable based on application operational requirements, upper-level OS operational requirements, hardware component activity, and other factors.

In some implementations, the network power module sets a timer in certain power states—such as in low power states. The timer establishes a wakeup period, which may be adaptable, during which the device and/or the network communication hardware remains in a low power state. After the wakeup timer expires, the device and/or the network communication hardware revert into a high power state or re-evaluated operational information and hardware device activity to determine whether to transition to a high power state, to adjust a timeout period or to adjust the wakeup period. It should be understood that detected hardware device activity or high-priority demand (e.g., by an application or OS module) may trigger a transition to a high power state independent of the state of the wakeup period time. The wakeup period may be adjustable based on application operational requirements, upper-level OS operational requirements, hardware component activity, and other factors.

Plot 104 illustrates an overall power usage level of the device 102 during various phases of operation. The y-axis of plot 104 indicates overall power usage level of the device 102 and the x-axis of plot 104 indicates time. Point 106 illustrates a period of time during which the device 102 is consuming a higher level of power. Point 108 illustrates a period of time during which the device 102 is consuming a low level of power due to the transitioning of one or more system hardware components to a low power mode, such as, for example, after the expiration of a timeout period. Point 110 illustrates a return to higher level of power consumption by device 102, such as, for example, at the end of a wakeup period of one or more system hardware components. Point 112 illustrates a medium level of power consumption by device 102, such as when one or more system hardware components have been transitioned to a low power mode, but not as many system hardware components as were transitioned at point 108. Alternatively, point 112 may illustrate a power consumption level represented by one or more system hardware components in an intermediate power state that is between a high power state and a low power state. Point 114 illustrates a return to a lower level of power consumption by device 102, such as when a user has indicated a preference for longer battery time over performance, and an arbitrator has transitioned one or more system hardware components into low power states. Point 116 illustrates an increase in power consumption by device 102, such as when a wakeup period has concluded and one or more system hardware components transition into higher power modes.

Figure 2:
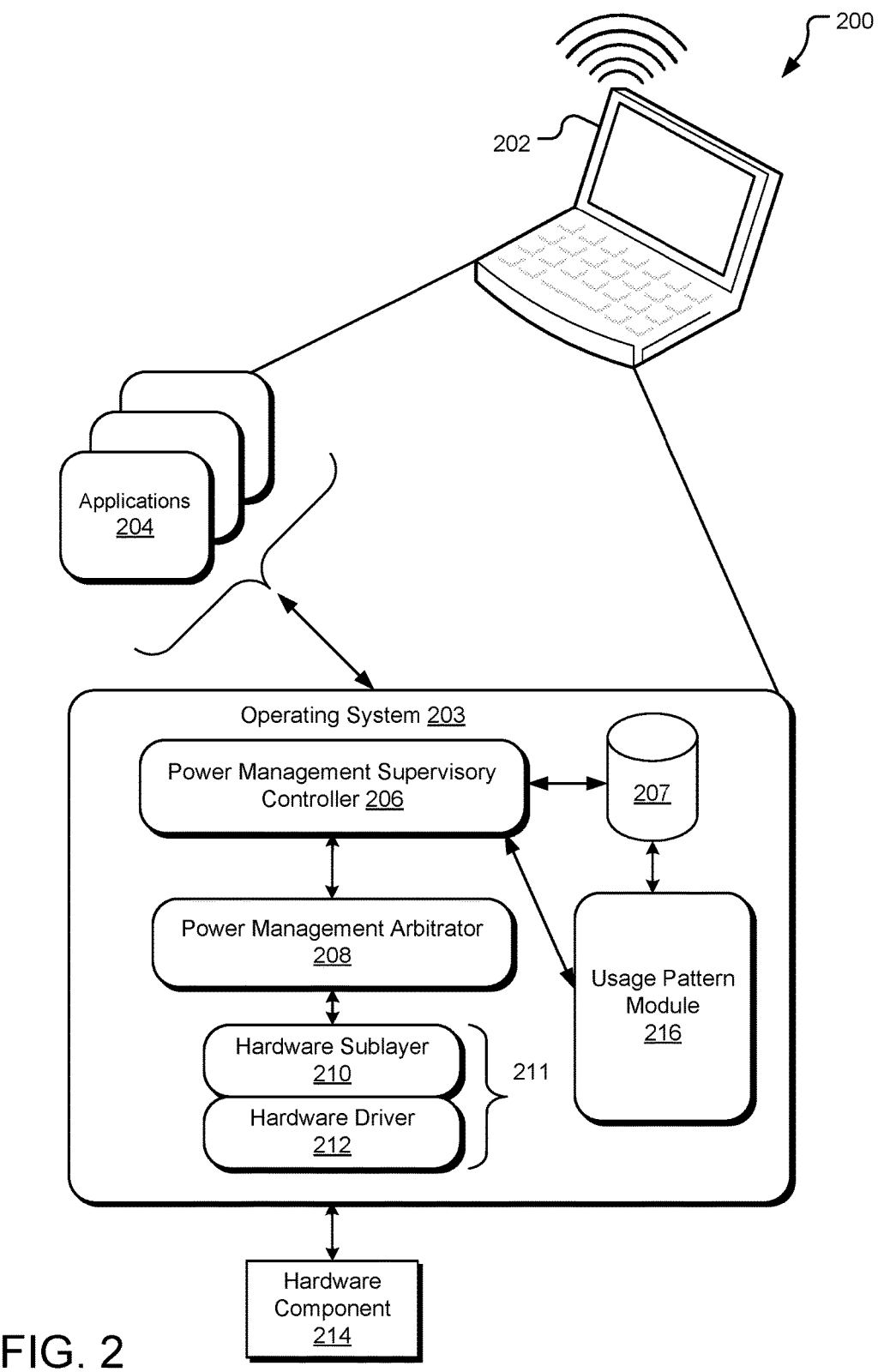
FIG. 2 illustrates an example environment for usage pattern based supervisory control of power management on a device.

FIG. 2 illustrates an example environment 200 for usage pattern based supervisory control of power management on a device 202. The device 202 includes an OS 203 and a variety of applications 204 executing thereon. The applications 204 may include components of the OS as well as other executable applications. Some of the applications 204 seek to use resources provided by a hardware component 214 that is part of the device 202. Requests from the applications 204 to use hardware component 214 are managed by a power management supervisory controller 206. In an implementation, the power management supervisory controller is a part of the OS. If there are no pending requests to use hardware component 214 from the applications 204, then the power management supervisory controller 206 can direct the hardware component 214 to transition to a low power state. A command to transition the hardware component 214 may be communicated from the power management supervisory controller 206 to the hardware component via one or more intermediate levels. In an implementation, the intermediate levels include a power management arbitrator 208, a hardware sublayer 210, and a hardware driver 212. The hardware sublayer and hardware driver may be referred to herein as the hardware interface controller 211, which may include a combination of hardware and software components.

The device 202 includes a usage pattern module 216. The usage pattern module 216 is in communication with the power management supervisory controller, the applications 204, a data store 207, and the various hardware components of the device 202. The usage pattern module 216 collects operational information from the applications 204 regarding use of the hardware components by the applications 204. The usage pattern module 216 may store historical data relating to usage patterns in the data store 207 for later retrieval and analysis. Upon determining a current usage pattern of a hardware component of the one or more applications 204, the usage pattern module 216 may communicate the current usage pattern to the power management supervisory controller 206 such that the power management supervisory controller 206 may determine power management parameters (e.g., timeout periods, wakeup periods, target number of transitions from higher-power to lower-power states of a hardware component, target power consumption of a hardware component, etc.). Alternatively, or additionally, the usage pattern module 216 may itself determine or recommend power management parameters to the power management supervisory controller 206 based on the determined usage patterns.

The usage pattern module 216 may collect user preference information from a user of the device 202. In an implementation, the usage pattern module 216 causes the OS 203 to present a graphical user interface to a user of the device 202 to collect the user preference information. In another implementation, the user of the device 202 may express power management preference information via a control panel of the OS 203. Power management preference information collected from the user of the device 202 includes information relating to the performance of hardware components of the device 202. For example, if power management parameters cause a video adapter of the device 202 to enter a lower-power mode in which the frame rate of the video adapter falls from 60 frames per second to 30 frames per second when a video game application is executing on the device 202, the user of the device 202 may become dissatisfied with the performance of the video adapter. The user of the device 202 may accordingly express user preference information that the user does not wish the video adapter of the device to enter a power state that would cause the frame rate of the video adapter to perform at a reduced rate when the video game application is executing on the device 202. In another implementation, the usage pattern module 216 may present a graphical user interface to a user based on the satisfaction of a power consumption condition. One example of a power consumption condition is the current battery power level of the device 202. If the current battery power level of the device 202 decreases past a threshold, for example, 20% of full battery power, then the usage pattern module 216 may present a graphical user interface to a user of the device 202 to request the user's preference whether a hardware component of the device 202 should transition to a lower-power mode. In another implementation, the graphical user interface presented to the user of the device 202 may display the effect on performance of the hardware component if the hardware component is transitioned to the lower-power mode.

If there are pending requests from the applications 204 to use the hardware component 214, then the power management supervisory controller may not be aware of the true demand for the hardware component 214 because applications 204 may register with the power management supervisory controller 206 to use the hardware component 214 without necessarily using the hardware component 214 or may only use the hardware component sporadically or with a usage pattern that leaves the hardware component 214 idle for periods of time. Accordingly, the power management supervisory controller 206 may delegate power management decisions to a lower level of the OS (e.g., the power management arbitrator 208). The power management arbitrator 208 monitors the load on the hardware component 214 and the applications 204 that are using the hardware component 214. The power management arbitrator 208 may independently transition the hardware component 214 to a low power state (or an intermediate lower power state) for periods of time during which the hardware component 214 would not have been transitioned to a low power state if the transitioning decision had been based on registrations of applications 204 to use the hardware component 214.

In at least one implementation, the power management supervisory controller is in communication with a data store 207. The data store 207 contains a variety of information regarding timeout periods that are available for use by the power management supervisory controller 206, which may be implemented by the power management supervisory controller 206 directly or delegated to the power management arbitrator 208 or other lower levels of the OS 203. The data store 207 may include tables of timeout periods with timeout periods associated with particular applications 204. In one implementation, the power management supervisory controller 206 selects a timeout period from a plurality of timeout periods in data store 207 to pass to the power management arbitrator 208. For example, the power management supervisory controller 206 may select the longest timeout period from a set of timeout periods corresponding to the applications 204 running on OS 203 as the timeout period the power management arbitrator 208 should use for a hardware component 214. In at least one implementation, the power management supervisory controller 206 queries one or more applications 204 for preferred timeout periods associated with the hardware component 214 and stores the preferred timeout periods associated with the hardware component 214 in the data store 207.

In an implementation, the power management arbitrator 208 sets a timeout period for the hardware component 214. If there is no activity on the hardware component 214 during the timeout period, then the power management arbitrator 208 causes the hardware component 214 to transition to a low power (or lower power) mode. The length of the timeout period for hardware component 214 may be chosen according to the algorithms disclosed herein. Control of the power state of the hardware component 214 and setting the timeout period of the hardware component 214 (and other hardware components that are part of the device 202) may be on a per device basis, a per application or application type basis, on a battery status basis, on a user preference basis, on a device feedback basis, on a recent history basis, etc. The power management supervisory controller 206 may further set a wakeup period for the hardware component 214 according to the algorithms disclosed herein. Control of the power state of the hardware component 214 and setting the wakeup period of the hardware component 214 (and other hardware components that are part of the device 202) may also be on a per device basis, a per application or application type basis, on a battery status basis, on a user preference basis, on a device feedback basis, on a recent history basis, etc.

In at least one implementation, the power management arbitrator 208 causes the hardware component 214 to transition between power modes by communicating with a hardware sublayer 210 and/or a hardware driver 212. In the case where the hardware component 214 is a network adapter, the hardware sublayer 210 may include an NDIS API and the hardware driver 212, referred to herein as a miniport driver. Other hardware sublayers 210 and hardware drivers 212 may be appropriate for other types of hardware components 214. In an implementation, the power management arbitrator may set a timer in one of the lower levels (e.g., the hardware sublayer 210 and/or the hardware driver 212) to manage transitioning the hardware component 214 to a low power mode such that the hardware sublayer 210 and/or the hardware driver 212 will transition the hardware component 214 to the low power mode without action by the power management arbitrator 208, the power management supervisory controller 206, or other parts of the OS 203.

In at least one implementation, the power management supervisory controller 206 communicates with a policy store that stores priority information for one or more applications executing on OS 203. The priority information in the priority store may be static or configurable. Where configurable, the priority of an application may be configured by a user (such as during or after install), by a group policy, or by another mechanism. Some applications may have a statically assigned priority. Based on the application priority in the priority store and the power state of the device 202, the power management supervisory controller 206 may set timeout and wakeup periods, responsive to the requests or attempts from the applications executing on OS 203 to use the hardware component 214.

Figure 3:
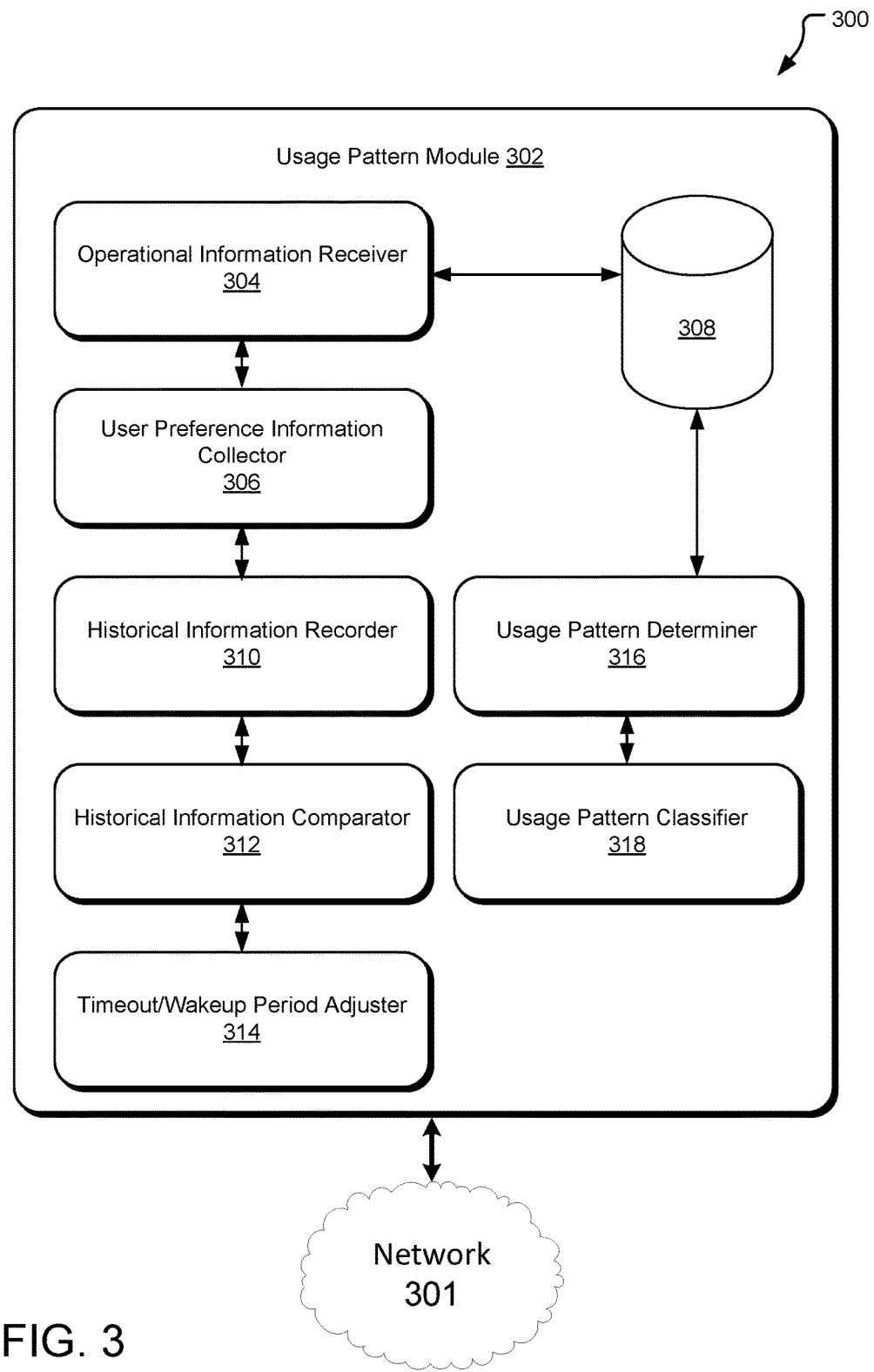
FIG. 3 illustrates an example usage pattern module in an environment for usage pattern based supervisory control of power management.

FIG. 3 illustrates an example usage pattern module 302 in an environment 300 for usage pattern based supervisory control of power management. The usage pattern module 302 is part of an electronic device equipped with supervisory control of power management including, for example, a supervisory power management controller, a power management arbitrator, a data store 207, etc. The device including the usage pattern module 302 further includes an OS and one or more system hardware components (not shown) that are capable of transitioning between one or more high power modes and low power modes.

The usage pattern module 302 is communicatively coupled to a supervisory controller, a data store 308, and/or other components of the electronic device operating under usage pattern based supervisory control of power management. The usage pattern module 302 includes components that perform a variety of functions. One of the components of the usage pattern module 302 is the operational information receiver 304. The operational information receiver 304 receives operational information from the applications executing on the OS of the electronic device regarding their use or requested use of a hardware component on the electronic device. The operational information received by the operational information receiver 304 may include different types of information describing the state and usage history of system hardware components on the electronic device. For example, without limitation, the received operational information may include a length of time that a particular application has requested use of a hardware component, the number of times an application has requested use of a hardware component, the amount of power an application's use of a hardware component has consumed, whether the needs of an application's use of a hardware component may be satisfied in a higher-power state compared to a lower-power state, whether the hardware component would have been able to satisfy some or all of the application's requests to use the hardware component if it had been in a higher-power state or a lower-power state at the time of the request to use the hardware component, etc.

One of the components of the usage pattern module 302 is the usage pattern module 316. The usage pattern module 316 is configured to determine a plurality of potential usage patterns of the electronic device. In an example where the system hardware component is a network adapter, the usage pattern module 316 may determine a plurality of usage patterns associated with the network adapter. For example, without limitation, the electronic device may include a network adapter that is capable of multiple power consumption states, and, based on the collected activity information, appears to be in a state of use wherein the operational information received by the operation information receiver 304 indicates that one or more applications executing on the electronic device request shorts bursts of network traffic punctuated by longer periods of network inactivity such as when a user is creating a document in a word processor application while listening to music on a streaming music application. In this scenario, the word processor may request little to no use of the network adapter while the streaming music application requests short bursts of network activity to download and queue the next song in a playlist punctuated by periods of time during which the network adapter is not needed by the applications. This usage scenario could be determined to be a potential usage pattern by the usage pattern module 318 based on analysis of the received operational information and stored in the data store 308 or it could be determined to be a potential usage pattern by developers who have identified and programmed the usage pattern module 316 to recognize such a pattern in the received operational information.

Another example of a potential usage pattern determined by the usage pattern module 316 is when a user is executing a video game application. It may be important to the user to maintain a high frame rate of the application while playing, such as 60 frames per second. While the user is playing the game, the video adapter on the electronic device may be in a high-power mode to support the high frame rate. When the user pauses the game application or enters an idle state after stepping away from the keyboard, the video game application may still be executing, but without the need to support a high frame rate. In this scenario, the video adapter may be transitioned to a lower-power state until the user returns. The usage pattern module may identify this usage pattern when operational information that indicates the video game user has entered an idle state.

Another example of a potential usage pattern determined by the usage pattern module 316 is when a user is streaming video content and is not actively using any other applications. In this scenario, the application streaming video content, which may be a web browser, may download the content in discrete segments with each segment representing data for a portion of the video. The application streaming the content may, therefore, request network communications from the network adapter while each video segment is being downloaded with gaps of idle or low network usage in between. Many other usage patterns are also possible based on any type of hardware component and any type of usage, either envisioned by developers of the aggregated power management arbitrator.

Another component of the usage pattern module 302 is the user preference information collector 306. In implementations, user preference information may be relied upon in part to perform usage pattern based supervisory control of power management on the electronic device. In one implementation, the user preference information collector 306 may collect user preference information from a user of the device. In an implementation, the user preference information collector 306 causes the OS of the device to present a graphical user interface to a user of the device to collect the user preference information. In another implementation, the user of the device may express power management preference information via a control panel of the OS of the device.

Another component of the usage pattern module 302 is the usage pattern classifier 318. The usage pattern classifier 318 is in communication with, among other components of the usage pattern module 302, the operational information receiver 304 and the data store 308. The usage pattern classifier 318 is configured to analyze received operation information and classify a current usage pattern of the electronic device as one of the usage patterns determined by the usage pattern module 316. In an implementation, determined usage patterns are associated with power management parameters applied when the electronic device satisfies the usage pattern such as timeout periods, wakeup periods, a target number of transitions from a higher-power state to a lower-power state, a target maximum power consumption by a hardware component, etc. In an implementation, the usage pattern classifier communicates a classified current usage pattern and associated power management parameters to the other components of the usage pattern module 302.

Power management preference information collected from the user of the device may include information relating to the performance of hardware components of the device. For example, if power management parameters cause a video adapter of the device to enter a lower-power mode in which the frame rate of the video adapter falls from 60 frames per second to 30 frames per second when a video game application is executing on the device, the user of the device may become dissatisfied with the performance of the video adapter. The user of the device may accordingly express user preference information that the user does not wish the video adapter of the device to enter a power state that would cause the frame rate of the video adapter to perform at a reduced rate when the video game application is executing on the device. In another implementation, the user preference information collector may present a graphical user interface to a user based on the satisfaction of a power consumption condition. One example of a power consumption condition is the current battery power level of the device. If the current battery power level of the device decreases past a threshold, for example, 20% of full battery power, then the user preference information collector 306 may present a graphical user interface to a user of the device to request the user's preference whether a hardware component of the device should transition to a lower-power mode. In another implementation, the graphical user interface presented to the user of the device may display the effect on performance of the hardware component if the hardware component is transitioned to the lower-power mode.

Another component of the usage pattern module 302 is the historical information recorder 310. The historical information recorder 310 stores operational information received by the operational information receiver 304 in the data store 308. Information stored by the historical information recorder in the data store 308 may be used by other components of the usage pattern module 302 to determine usage patterns of the electronic device and to classify a current usage of the electronic device as satisfying on of the determined usage patterns. The historical information recorder 310 may also store activity information from one or more hardware components of the electronic device in the data store 308 including, without limitation, hardware, software, and/or firmware versions of the hardware components, the number of processing cycles used by applications on the electronic device, etc.

Another component of the usage pattern module 302 is the historical information comparator 312. The historical information comparator 312 is in communication with the data store 308 and the other components of the usage pattern classifier. The historical information comparator 312 compares the current operational information of applications executing on the electronic device and activity information of hardware components on the electronic device to historical operational information and historical activity information of hardware components of the electronic device. If there is a discrepancy between current operational information and/or activity information and historical operational information and/or activity information, the historical information comparator 312 may alert other components of the usage pattern module 302 of the possibility of a malfunction of a hardware component, a change in the configuration of a hardware component, or other scenarios that might have caused the hardware component to behave less efficiently or differently than the hardware component had performed in prior time periods when the electronic device was operating in the same usage pattern as the current usage pattern.

The timeout/wakeup period adjuster is a component of the usage pattern module 302 that is in communication with the other components of the usage pattern module 302. The timeout/wakeup period adjuster 314 is configured to adjust (or set) a timeout period based on information received from the other components of the usage pattern module 302. If the usage pattern module 316 determines that the electronic device satisfies a usage pattern with which a timeout period has been associated with a hardware component of the electronic device, then the timeout/wakeup period adjuster 314 may alter that timeout period based on information received from the user preference information collector 306. For example, if the electronic device satisfies a usage pattern wherein the user is viewing streaming video in a streaming video application, the usage pattern module 316 may have associated the usage pattern with a timeout period that would cause the device's network adapter to transition into a lower-power mode wherein the network adapter consumes less power but is capable of streaming video at a rate supportive of 2K video but not 4K video. If the user preference information collector 306 has collected user preference information indicating that a user wishes the video to remain in 4K quality, then the timeout/wakeup period adjuster 314 may increase the timeout period associated with the aforementioned streaming video usage pattern such that the video quality remains at 4K.

The timeout/wakeup period adjuster 314 may adjust timeout periods associated with usage patterns in other ways as well. If the historical information comparator communicates that the current power usage profile of a hardware component associated with the electronic device is consuming more power than the device has historically consumed in that usage profile, the timeout/wakeup period may increase the timeout period for the hardware component to attempt to return the device to a power consumption state more consistent with prior power consumption in the usage pattern.

The timeout/wakeup period adjuster 314 may also perform other functions. In one implementation, the timeout/wakeup period adjuster 314 selects heuristic test values for timeout and/or wakeup periods (e.g., power savings parameters) for a hardware component associated with a determined usage pattern on the electronic device. After operating for a test period of time under the heuristic test values, the historical information recorder 310 stores operational information regarding the one or more applications executing on the electronic device during the test period of time and stores activity information regarding the hardware component during the period of time. The timeout/wakeup period adjuster may then compare the power efficiency of the hardware component during the test period of time to the power efficiency of the hardware component when using other power savings parameters.

As one example of heuristic power savings parameters, a heuristic test timeout period that is shorter than a previously applied timeout period may cause a hardware component to transition into a lower-power state more frequently and consume less energy under a determined usage pattern than under a previously applied timeout period under the same usage pattern. Depending on other information, such as whether the user preference information collector 306 identifies user preference information indicating that the user does not wish the hardware component to transition more frequently to the lower-power state under the determined usage pattern, the timeout/wakeup period adjuster 314 may conclude that the heuristic test timeout period is a better choice for a timeout period under the determined usage pattern than the timeout period that the electronic device had previously applied under that usage pattern. The timeout/wakeup period adjuster 314 may then substitute the heuristic test timeout period value for the previously applied timeout period value for the hardware component when the electronic device satisfies the determined usage pattern.

Figure 4:
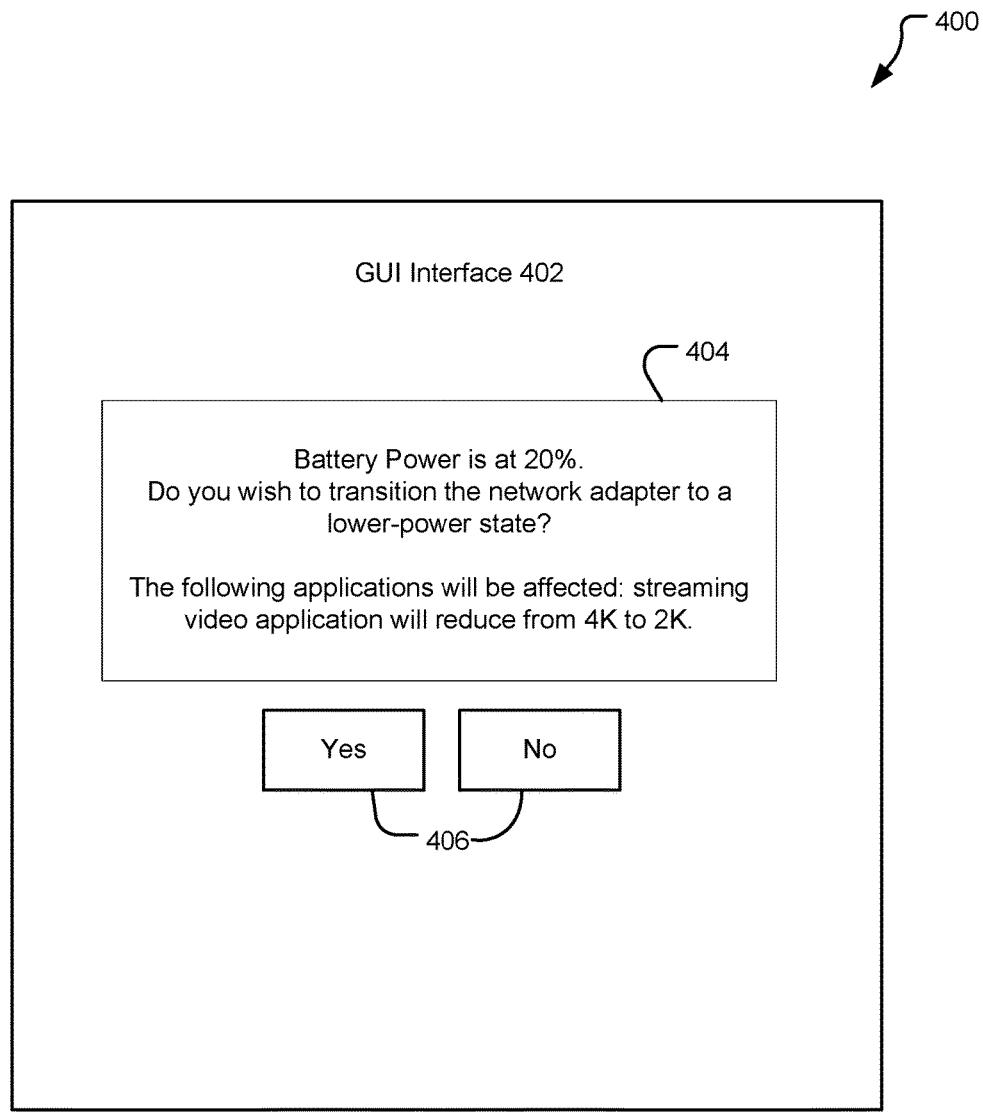
FIG. 4 is a graphical user interface environment with a graphical user interface dialog window on a device with usage pattern based supervisory control of power management.

FIG. 4 is a graphical user interface environment 400 with a graphical user interface 402 including a dialog window on a device with usage pattern based supervisory control of power management. In an implementation, a user preference information collector causes the OS of the device to present the graphical user interface 402 to a user of the device to collect user preference information. In an implementation, the GUI interface 402 is presented to a user of an electronic device when a transition from a higher-power state of a hardware component to a lower-power state of the hardware component is likely to alter the user's experience. Information regarding the impact of the transition of the hardware component from the higher-power state to the lower-power state is reflected in the text box 404. In one example, the detected usage pattern of the electronic device is one wherein a user is streaming high-quality video. Receipt of the data representing the video in a high-quality format (e.g., 4K video) may require higher power consumption by the electronic device's network adapter. Transitioning the network adapter to a lower-power state may preclude processing of the data required to maintain high-quality video streaming. Instead, the electronic device could stream the video in a lower-quality format (e.g., 2K video) if the hardware component has been transitioned into the lower-power state.

The user of the electronic device may be asked by the GUI interface 402 to indicate the user's preference as to whether the hardware component should transition into the lower-power state via choice buttons 406. If the user indicates a preference via choice buttons 406 not to transition the hardware component to a lower-power mode, the hardware component may be maintained in the current power mode or transitioned to an intermediate power mode. If the user indicates a preference via choice buttons 406 to transition to a lower-power mode, then the hardware component may be transitioned to the lower-power mode. Aspects of the OS on the electronic device may override a user's preference regarding the power management of a hardware component in certain situations. For example, if the battery power level of electronic device is critically low, the OS may enforce a transition of a hardware component or components to a lower-power mode despite a user's preference to the contrary. Alternatively, or additionally, other low level OS components that track the overall power usage of the electronic device may override a user's power management preferences if the low-level OS component determines that the electronic device should save more energy.

In at least one implementation, the GUI interface 402 is shown to the user of the electronic device when the electronic device satisfies a power consumption condition, such as when the battery of the electronic device is at or below a power savings value (e.g., when the battery of the electronic device is at or below 20% of full capacity). Information regarding the power savings value that triggered the display of the GUI interface 402 may be displayed in the text box 404.

Figure 5:
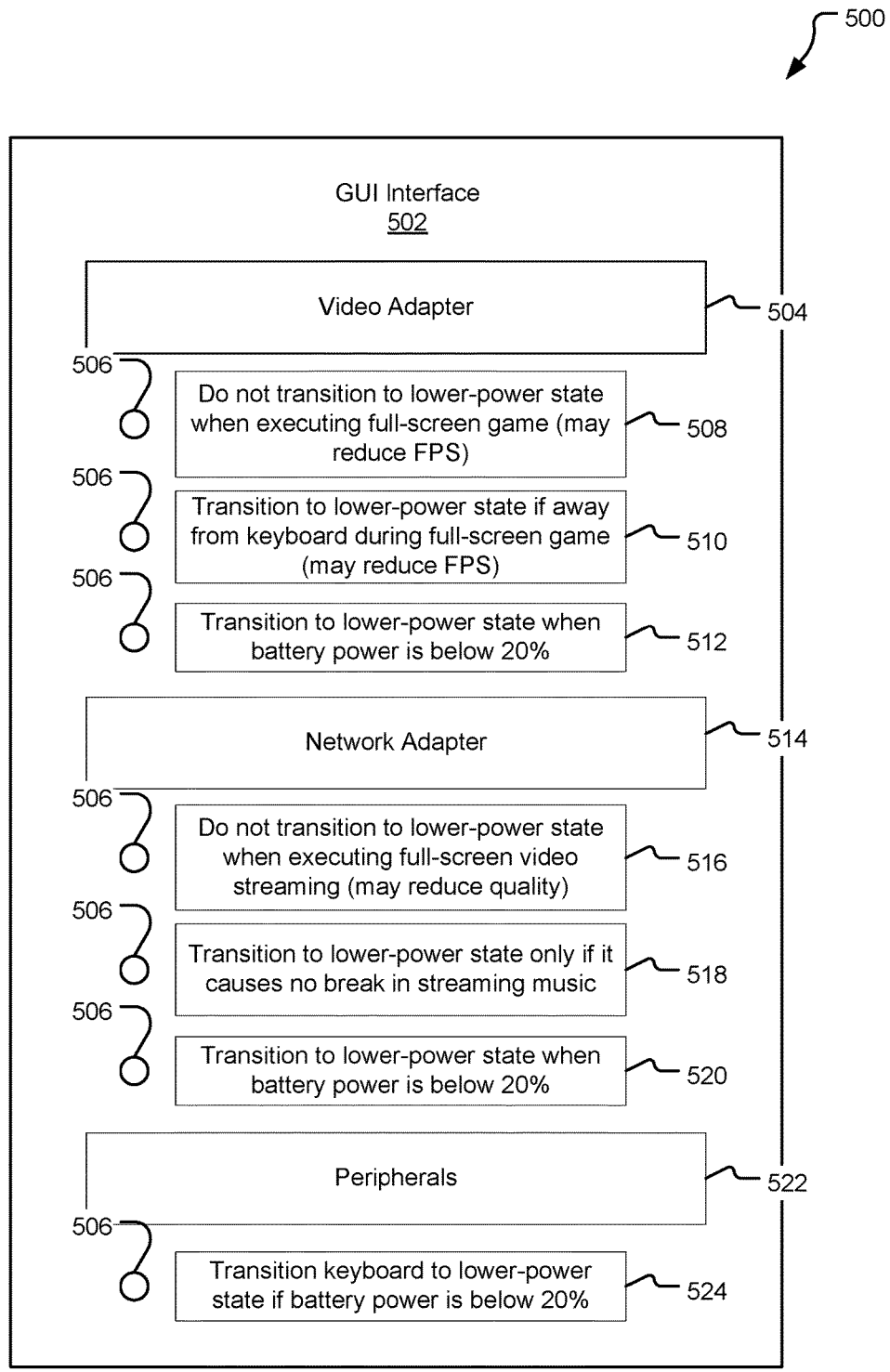
FIG. 5 is a graphical user interface control panel environment with a graphical user interface dialog window on a device with usage pattern based supervisory control of power management.

FIG. 5 is a graphical user interface control panel environment 500 with a graphical user interface dialog window 502 on a device with usage pattern based supervisory control of power management. The GUI interface 502 may be part of an OS executing on the electronic device or another application executing on the electronic device configured to manage user preferences on power management of the electronic device. In one implementation, the GUI interface 502 includes sections relating to one or more of the various hardware components included on the electronic device, such as, for example, a video adapter section 504, a network adapter section 514 and peripherals section 522.

Under the power management sections 504, 514, and 522, there are three power management user preference panels pertaining to power management of a hardware component under a determined usage pattern. Each power management user preference panel has a selectable button 506. The user may indicate a user preference with respect to each of the power management user preference panels by selecting or unselecting the button 506. Other types of GUI interfaces may be used to collect user preference information from a user of the electronic device including without limitation radio buttons, check boxes, picklists, text fields, etc.

The power management section 504 relates to the video adapter of the electronic device. Under the power management section 504, there are three power management preference panels 508, 510, and 512, each with potential usage patterns of the video adapter and potential changes to the power mode status video adapter that the supervisory controller on the electronic device could make to improve power efficiency of the video adapter. The usage pattern preference panels 508, 510, and 512 are exemplary usage patterns, and various other usage patterns are also contemplated. The power management preference panels may be based on historical usage patterns encountered by the electronic device in the past, may be determined in advance of any use of the device based on common or expected usage patterns, and/or may be based on the types of hardware components or applications installed on the electronic device.

The power management user preference panel 508 states a user preference not to transition the video adapter to a lower-power mode while a video game application is executing in a full-screen mode. When the supervisory controller and/or power management arbitrator on the electronic device transition a video adapter to a lower-power mode, it may cause oscillators on the video adapter to slow or stop, thus negatively impacting the performance of the video adapter. One type of negative performance impact is to lower the FPS (frames per second) of the video adapter. If a gaming enthusiast user prefers a higher FPS when playing full-screen games, the user may prioritize frame rate over battery performance. Such a user could select the button 506 to express that preference and instruct the power management arbitrator not to make a power mode transition of the video adapter that would cause a degradation of the FPS experienced on the video game application.

The power management user preference panel 510 states a user preference to transition the video adapter to a lower-power mode while a video game application is executing in full-screen mode if the user is AFK (away from keyboard). Although the gaming enthusiast may prefer a high FPS over battery performance, that preference may only apply to a usage pattern wherein the gaming enthusiast user is actually playing the game. If the user goes AFK, then the user may no longer prioritize FPS over battery power. The user may express this preference by selecting the button 506 corresponding to the power management user preference panel 510.

The power management user preference panel 512 states a user preference to transition the video adapter to a lower-power mode when the battery charge level is at 20% or below. The power management user preference panel 512 includes a power savings condition wherein the user may depart from the user's normal power management preferences to preserve battery life of the electronic device. Although the user may generally prefer good FPS performance to battery performance, this preference may only apply if the electronic device is not in danger of completely depleting the battery. The user may express this preference by selecting the button 506 corresponding to the power management user preference panel 512.

The power management section 514 relates to the network adapter hardware component on the electronic device. The power management section 514 includes power management user preference panels 516, 518, and 520 expressing potential power management user preferences relating to potential usage patterns of the network adapter on the electronic device. Power management usage panel 516 states a user preference not to transition the network adapter to a lower-power state when executing an application streaming video in a full-screen mode. The power management user preference panel 516 includes a potential impact of the power mode transition on the user experience (e.g., that the video quality of the streaming video could decrease from 4K to 2K). The user may indicate this power management preference by selecting the button 506 corresponding with the user power management preference panel 516.

The power management preference panel 518 states a power management preference to transition the network adapter to a lower-power state only if the transition causes no break in playback of a streaming music application. In this potential usage pattern, a streaming music application sequentially streams and queues songs in a music playlist. In between streaming songs, there may be periods of no network activity while the current song in the playlist finishes playing but before the next song begins to download. During this break in network activity, the power management arbitrator could set a power management parameters (e.g., timeout period and/or a wakeup period) that cause the network adapter to be in a low or lower-power mode when it is time to download the next song in the playlist. If these power management parameters cause a break in song playback, it could degrade the user experience. A user may express the preference for playback not to be so interrupted by selecting the button 506 corresponding to the power management user preference panel 518.

The power management preference panel 520 states a power management preference to transition the network adapter to a low-power mode if the battery charge level of the electronic device is at or below 20%. The power management user preference panel 520 includes a power savings condition wherein the user may depart from the user's normal power management preferences to preserve battery life of the electronic device. Although the user may generally prefer uninterrupted music streaming to battery performance, this preference may only apply if the electronic device is not in danger of completely depleting the battery. The user may express this preference by selecting the button 506 corresponding to the power management user preference panel 520.

The power management section 522 relates to peripherals of the electronic device. In power management preference panel 524, a power management preference is stated to transition a keyboard to a lower-power state if the battery charge level of the electronic device is at or below 20%. Transitioning a keyboard to a lower-power state may involve dimming or turning off lighting on the keyboard such as backlit keys, disabling communications on the keyboard such as a Bluetooth antenna, and/or reducing power consumption by disabling other features of the keyboard. The power management user preference panel 524 includes a power savings condition wherein the user may depart from the user's normal power management preferences to preserve battery life of the electronic device. Although the user may generally prefer uninterrupted music streaming to battery performance, this preference may only apply if the electronic device is not in danger of completely depleting the battery. The user may express this preference by selecting the button 506 corresponding to the power management user preference panel 524.

Figure 6:
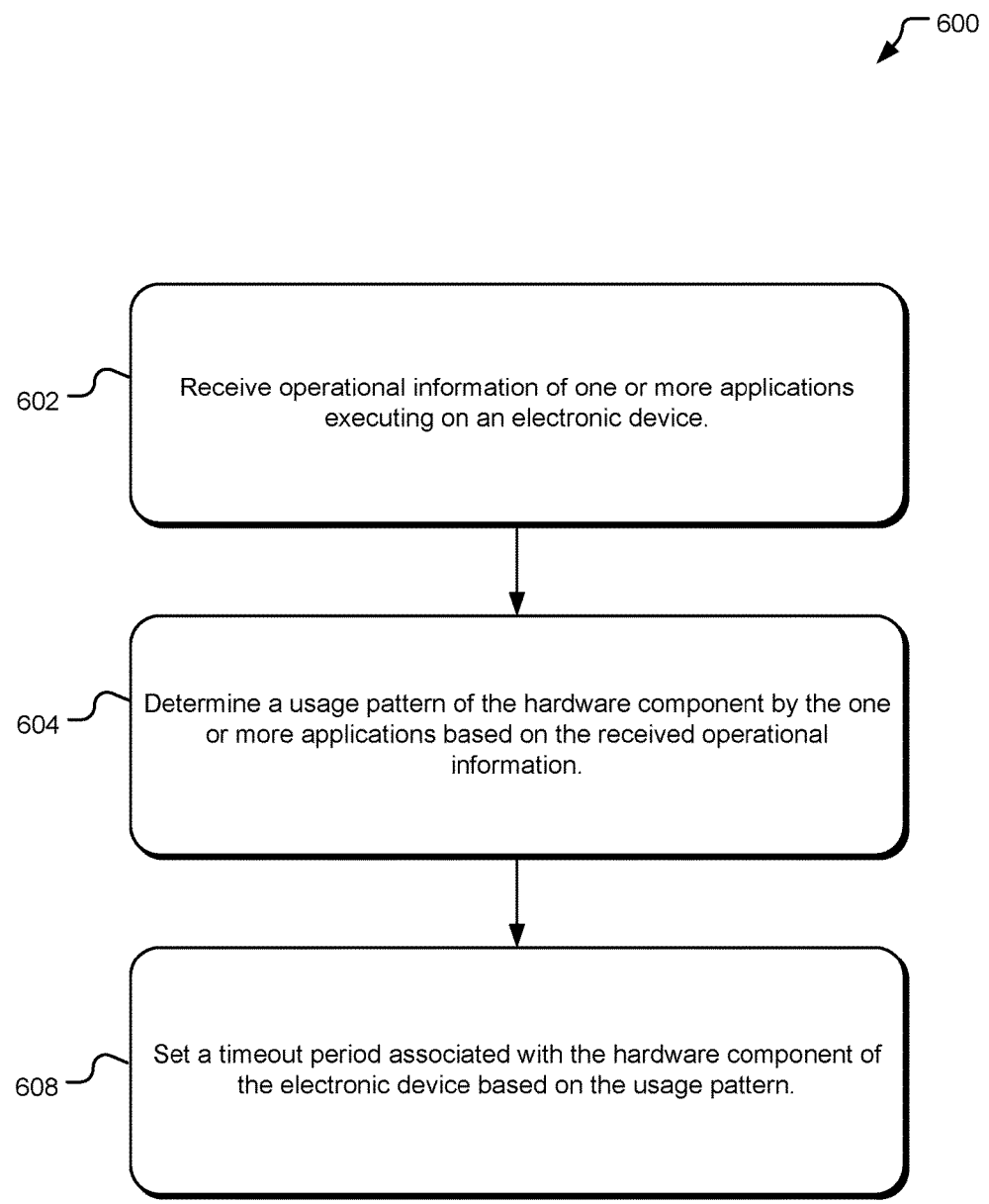
FIG. 6 illustrates a flow diagram showing example operations for providing usage pattern based supervisory control of power management to a device.

FIG. 6 illustrates a flow diagram showing an example operations 600 for providing usage pattern based supervisory control of power management to a device. A receiving operation 602 receives operational information of one or more applications executing on the electronic device. The operational information may include a variety of information relating to an application's use of a hardware component including without limitation the number of requests by the application for the hardware component to perform a function (e.g., send or receive data, display a frame on a monitor of the electronic device, provide input/output capabilities to the application, etc.), a length of time the one or more applications have registered with an OS of the electronic device to use the hardware component, the amount of time the one or more applications actually used the hardware component, etc.

A determining operation 604 determines a usage pattern of the hardware component by the one or more applications based on the operational information received in receiving operation 602. The determining operation 604 may determine the usage pattern in a variety of ways. In one implementation, the determining operation 604 determines the usage pattern based on a plurality of usage patterns in a data store on the electronic device, each usage pattern describing a type of use of the hardware component. In another implementation, the determining operation 604 determines a usage pattern of the electronic device based on historical activity information and historical operational information based on past use of the electronic device by the user. The determining operation 604 may select from a plurality of usage patterns identified by developers of various parts of the electronic device such as publishers of an OS executing on the electronic device, publishers of the one or more applications executing on the electronic device, manufacturers of a hardware component on the electronic device, OEM manufacturers of the electronic device, etc.

A setting operation 606 sets a timeout period associated with the hardware component of the electronic device based on the usage pattern determined in the determining operation 604, the timeout period defining a minimum amount of time before a power state of the hardware component is permitted to be transitioned from a higher-power state to a lower-power state. The setting operation 606 may be performed by a supervisory control component of the electronic device such as a power management arbitrator. The setting operation 606 may include selecting a timeout period from a data store locally on the electronic device or located on a remote system that corresponds to the usage pattern determined in the determining operation 604. In another implementation, the setting operation 606 may be based on user preference information collected from a user of the electronic device. In yet another implementation, the setting operation 606 may be based on a heuristic test value selected by a supervisory power management component on the electronic device designed to test power management parameters for empirical evidence suggesting that a heuristic test value for a timeout period under a usage pattern is better than another timeout period value under the usage pattern. In yet another implantation, the setting operation may rely on a remote system to supply a timeout period value to the power management arbitrator based on information collected from other electronic devices that exhibit similar hardware component configurations and/or usage patterns to the electronic device.

Figure 7:
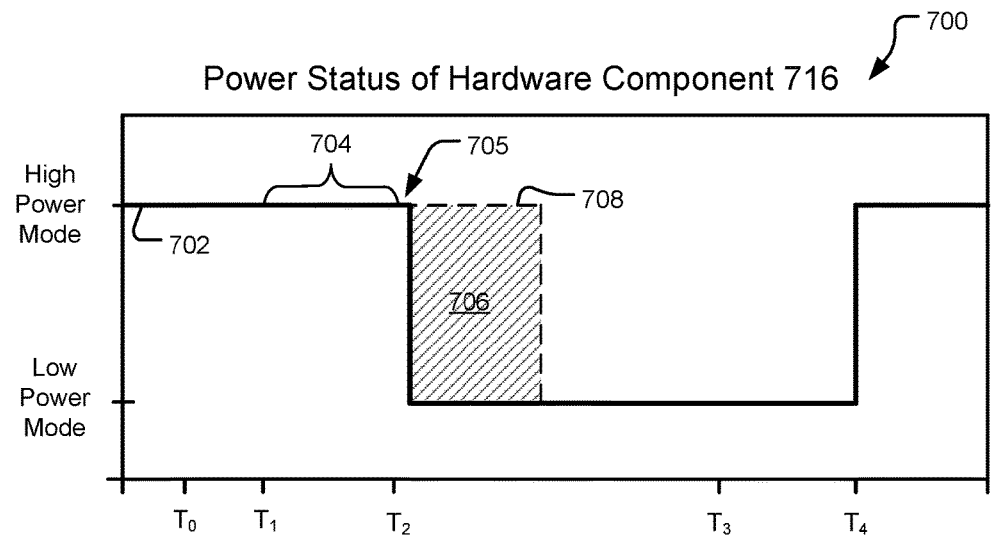
FIG. 7 is a plot of example power usage of a hardware component and a signal diagram illustrating interaction between the components of a device in an environment of usage pattern based supervisory control of power management.
Figure 7:
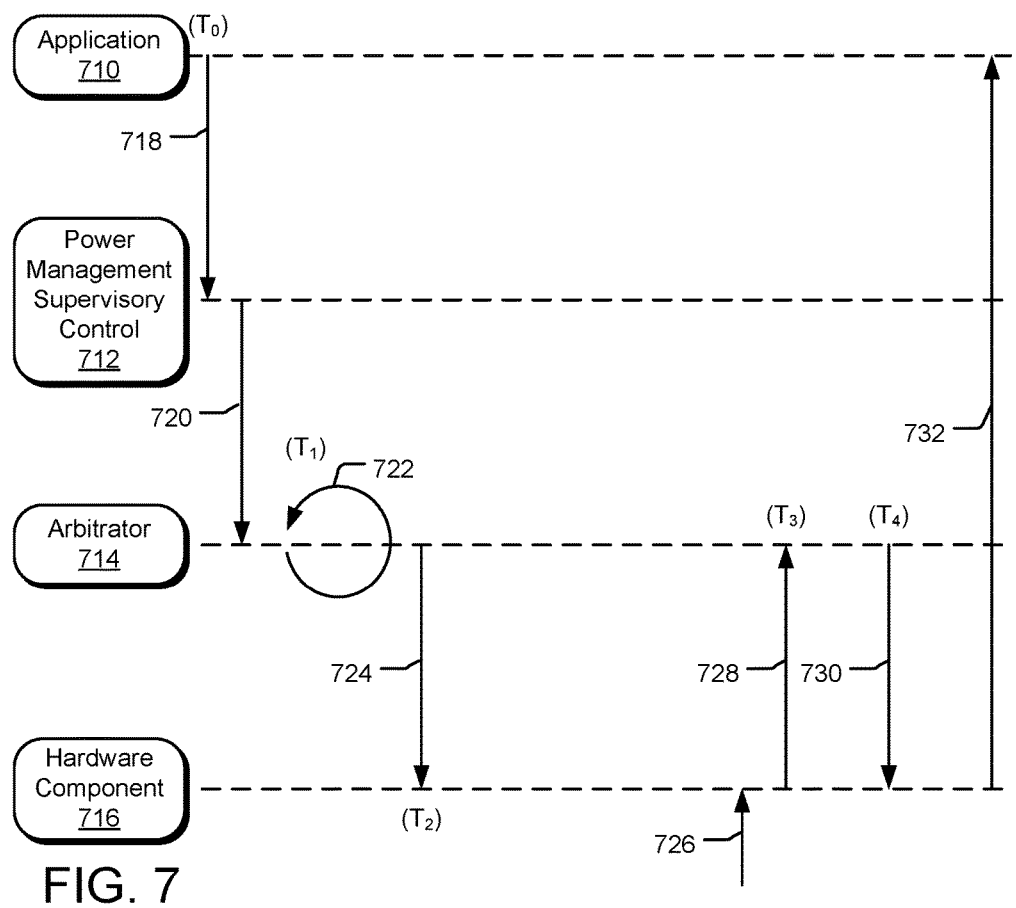

FIG. 7 is a plot of example power usage of a hardware component 716 and a signal diagram illustrating interaction between the components of a device under a supervisory control of power management environment 700. The plot includes a line 702 indicating whether the hardware component 716 is in a high-power mode or a low power mode. In other implementations, the hardware component 716 has more than two power modes. The two power modes of the hardware component 716 used herein are exemplary. The x-axis of the plot indicates time, and the time markers $T_0$-$T_4$ are on the same scale as the communications shown in the signal diagram below the plot.

At a time $T_0$, an application 710 executing on the computing device communicates a request to use the hardware component 716 to the OS of the device. The request to use hardware component 716 is received in communication 718 by the power management supervisory controller 712. Shortly after time $T_0$, the power management supervisory controller 712 informs the arbitrator 714 of information regarding the request from application 710 to use hardware component 716 in communication 720.

Communication 720 may include a variety of information regarding application 710 and the request to use hardware component 716 such as application 710's type, information regarding power management user preferences, historical power management information regarding the device and/or application 710, current battery status, etc. Communication 720 may also include a timeout period for hardware component 716. In another implementation, communication 720 does not include a timeout period for hardware component 716.

At time $T_1$, the timeout period 704 for hardware component 716 begins. In an implementation, during the timeout period 704, the arbitrator 714 monitors usage of the hardware component 716 at operation 722. If the hardware component 716 is not used during the timeout period 704, then the arbitrator 714 transitions the hardware component 716 into a low power mode at time $T_2$ via communication 724. A time shortly after time $T_2$ indicated by the arrow 705, the hardware component 716 is in a low power mode as indicated by line 702.

Transitioning the hardware component 716 to a low power mode at time $T_2$ is an improvement over other methods of power management that rely on application 710 to de-register its use of hardware component 716. The additional savings of supervisory power management in the form of an earlier transition of hardware component 716 is shown on the plot as area 706. Dashed line 708 indicates what the power status of hardware component 716 would have been if the device had relied on the application 710 to announce its relinquishment of the hardware component 716 instead of using the methods of supervisory power management disclosed herein.

In an implementation, the hardware component 716 may "listen" for an event that can trigger the hardware component 716 to transition to a different power mode. For example, if the hardware component 716 is a network adapter, the network adapter may scan only the headers of network packets for an indication that the hardware component 716 should wake up even though the hardware component 716 is in a low power mode. Such a packet may be referred to as a "wake packet" received in communication 726. Upon receipt of the wake packet in communication 726, the hardware component 716 informs the arbitrator 714 in communication 728 at time $T_3$. In an implementation, the arbitrator may itself transition the hardware component 716 into a higher power state in communication 730 at time $T_4$ without relaying the hardware component 716's receipt of the wake packet to higher levels of the OS, e.g., the power management supervisory controller 712, the application 710, or other parts of the OS. Upon receipt of communication 730 from the arbitrator 714 at time $T_4$, the hardware component 716 transitions to a higher power mode and communicates network traffic to the application 710 in communication 732.

Figure 8:
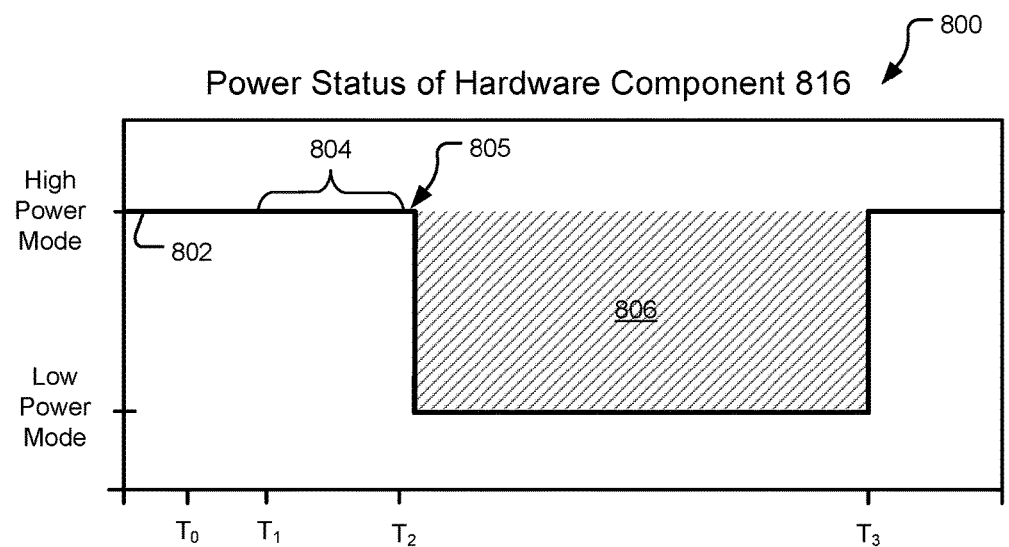
FIG. 8 is a plot of example power usage of a hardware component and a signal diagram illustrating interaction between the components of a device in an environment of usage pattern based supervisory control of power management.
Figure 8:
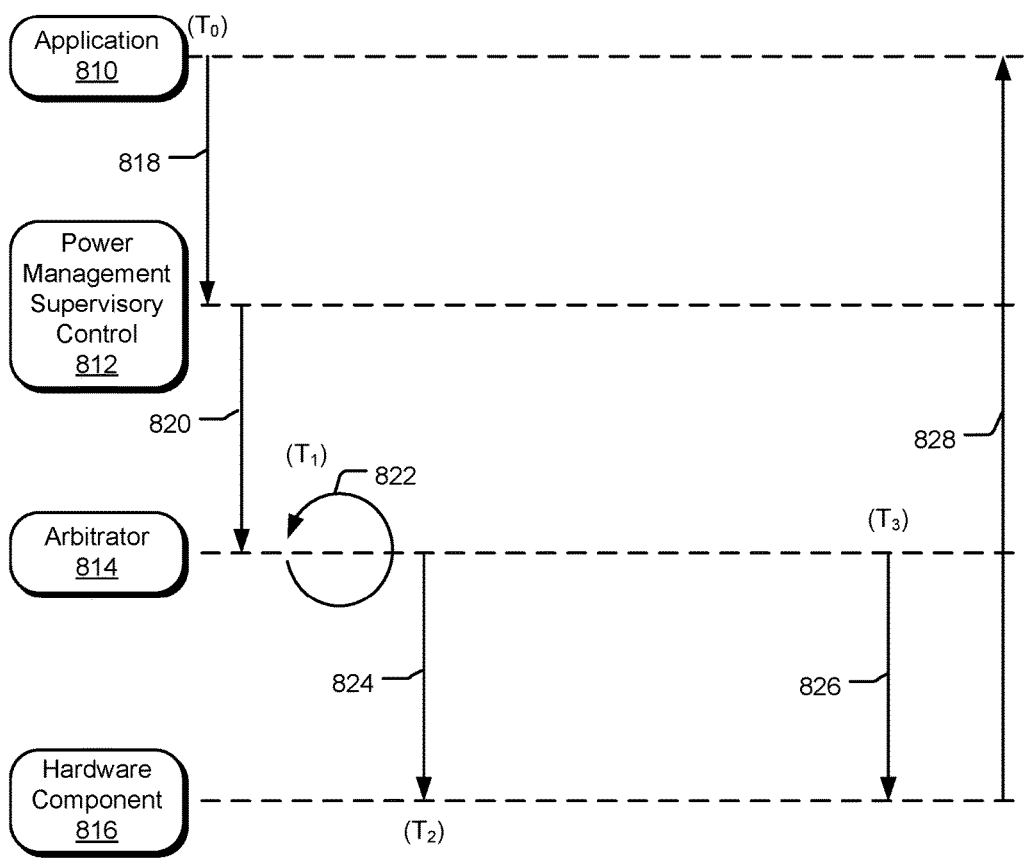

FIG. 8 is a plot of example power usage of a hardware component 816 and a signal diagram illustrating interaction between the components of a device under a supervisory control of power management environment 800. The plot includes a line 802 indicating whether the hardware component 816 is in a high-power mode or a low power mode. In other implementations, the hardware component 816 has more than two power modes. The two power modes of the hardware component 816 used herein are exemplary. The x-axis of the plot indicates time, and the time markers $T_0$-$T_3$ are on the same scale as the communications shown in the signal diagram below the plot.

At a time $T_0$, an application 810 executing on the computing device communicates a request to use the hardware component 816 to the OS of the device. The request to use hardware component 816 is received in communication 818 by the power management supervisory controller 812. Shortly after time $T_0$, the power management supervisory controller 812 informs the arbitrator 814 of information regarding the request from application 810 to use the hardware component 816 in communication 820.

Communication 820 may include a variety of information regarding application 810 and the request to use hardware component 816 such as application 810's type, information regarding power management user preferences, historical power management information regarding the device and/or application 810, current battery status, etc. Communication 820 may also include a timeout period for hardware component 816. In another implementation, communication 820 does not include a timeout period for hardware component 816.

At time $T_1$, the timeout period 804 for hardware component 816 begins. In an implementation, during the timeout period 804, the arbitrator 814 monitors usage of the hardware component 816 at operation 822. If the hardware component 816 is not used during the timeout period 804, then the power management arbitrator transitions the hardware component 816 into a low power mode at time $T_2$ via communication 824. A time shortly after time $T_2$ indicated by arrow 805, the hardware component 816 is in a low power mode as indicated by line 802.

After the hardware component 816 has been transitioned to a low power mode at time $T_2$, the arbitrator 814 sets a wakeup period 806 for the hardware component 816 represented by area 806 on the plot. The wakeup period 806 ends at time $T_3$ and arbitrator 814 sends a wakeup signal to hardware component 816 in communication 826. In one implementation, communication 826 transitions the hardware component 816 from the low power mode to a high-power mode as indicated by line 802. In another implementation, communication 826 simply transitions hardware component 816 into an intermediate power mode (not shown on the plot) wherein the hardware component 816 checks to see whether there is a pending request from application 810, any other applications, the OS, or other components of the computing device to use the hardware component 816. If there is such a request, then hardware component 816 may remain in the high-power mode as shown by line 802 in the plot. If there is not such a request, then hardware component 816 may return to the low power mode. If the hardware component 816 remains in the high-power mode, it may communicate with application 810 at communication 828.

Figure 9:
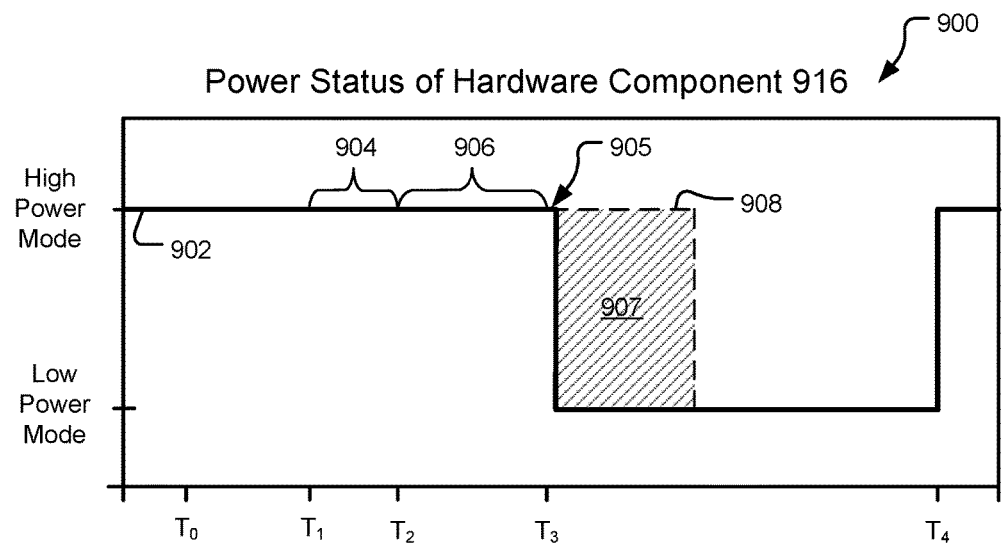
FIG. 9 is a plot of example power usage of a hardware component and a signal diagram illustrating interaction between the components of a device in an environment of usage pattern based supervisory control of power management.
Figure 9:
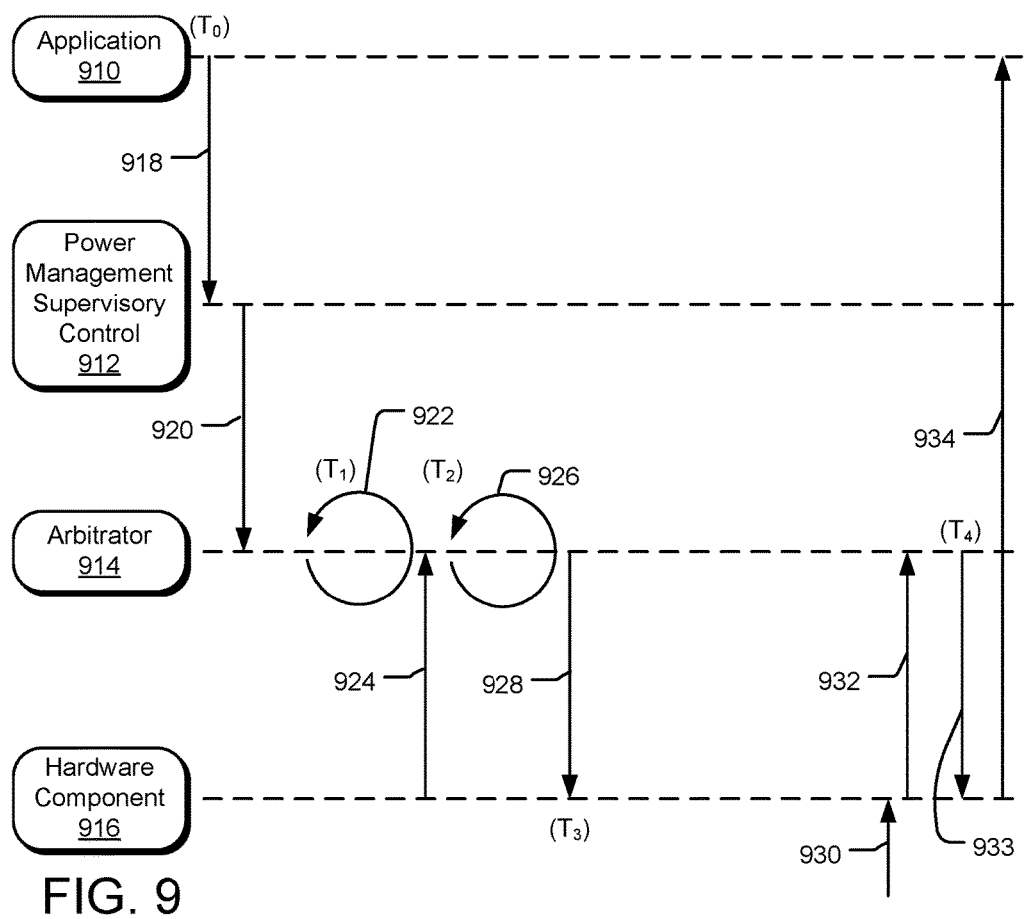

FIG. 9 is a plot of example power usage of a hardware component 916 and a signal diagram illustrating interaction between the components of a device under a supervisory control of power management environment 900. The plot includes a line 902 indicating whether the hardware component 916 is in a high-power mode or a low power mode. In other implementations, the hardware component 916 has more than two power modes. The two power modes of the hardware component 916 used herein are exemplary. The x-axis of the plot indicates time, and the time markers $T_0$-$T_4$ are on the same scale as the communications shown in the signal diagram below the plot.

At a time $T_0$, an application 910 executing on the computing device communicates a request to use the hardware component 916 to the OS of the device. The request to use hardware component 916 is received in communication 918 by the power management supervisory controller 912. Shortly after time $T_0$, the power management supervisory controller 912 informs the arbitrator 914 of information regarding the request from application 910 to use hardware component 916 in communication 920.

Communication 920 may include a variety of information regarding application 910 and the request to use hardware component 916 such as application 910's type, information regarding power management user preferences, historical power management information regarding the device and/or application 910, current battery status, etc. Communication 920 may also include a timeout period for hardware component 916. In another implementation, communication 920 does not include a timeout period for hardware component 916.

At time $T_1$, a first timeout period 904 for hardware component 916 begins. In an implementation, during the first timeout period 904, the arbitrator 914 monitors usage of the hardware component 916 at operation 922. During operation 922, the hardware component 916 becomes active at time $T_2$ and notifies the arbitrator 914 of the activity in communication 924. Receipt of communication 924 triggers the arbitrator 914 to reset the timeout period at time $T_2$ to a second timeout period 906. During the second timeout period 906, the arbitrator 914 monitors usage of the hardware component 916 at operation 926. If the hardware component 916 is not used during the timeout period 906, then the arbitrator 914 transitions the hardware component 916 into a low power mode at time $T_3$ via communication 928. A time shortly after time $T_3$ as indicated by arrow 905, the hardware component 916 is in a low power mode as indicated by line 902.

Transitioning the hardware component 916 to a low power mode at time $T_3$ is an improvement over other methods of power management that rely on application 910 to de-register its use of hardware component 916. The additional savings of supervisory power management in the form of an earlier transition of hardware component 916 is shown on the plot as area 907. Dashed line 908 indicates what the power status of hardware component 916 would have been if the device had relied on the application 910 to announce its relinquishment of the hardware component 916 instead of using the methods of supervisory power management disclosed herein.

In an implementation, the hardware component 916 may "listen" for an event that can trigger the hardware component 916 to transition to a different power mode. For example, if the hardware component 916 is a network adapter, the network adapter may scan only the headers of network packets for an indication that the hardware component 916 should wake up even though the hardware component 916 is in a low power mode. Such a packet may be referred to as a "wake packet" received in communication 930. Upon receipt of the wake packet in communication 930, the hardware component 916 informs the arbitrator 914 in communication 932 at time $T_4$. In an implementation, the arbitrator may itself transition the hardware component 916 into a higher power state in communication 933 at time $T_4$ without relaying the hardware component 916's receipt of the wake packet to higher levels of the OS, e.g., the power management supervisory controller 912, the application 910, or other parts of the OS. Upon receipt of communication 933 from the arbitrator 314 at time $T_4$, the hardware component 916 transitions to a higher power mode and communicates network traffic to the application 910 in communication 934.

In at least one implementation, the first timeout period 904 may be superseded by the second timeout period 906 when a component of the system receives a signal indicating that the hardware component 916 is active, would not satisfy an inactivity condition, and/or would not satisfy a transition condition at time $T_2$. As such, the first timeout period 904 is "cut off" by the second timeout period 906 once it is known that the hardware component 916 will not transition to the low power state at the end of the first timeout period 904. In another implementation, the first timeout period 904 may be allowed to run until its expiration even if it is known that the hardware component 916 did not satisfy a transition condition and/or an inactivity condition during the first timeout period 904. Instead, the first timeout period 904 is allowed to persist until it expired, and then the second timeout period 906 begins after the first timeout period 904 has completed.

Figure 10:
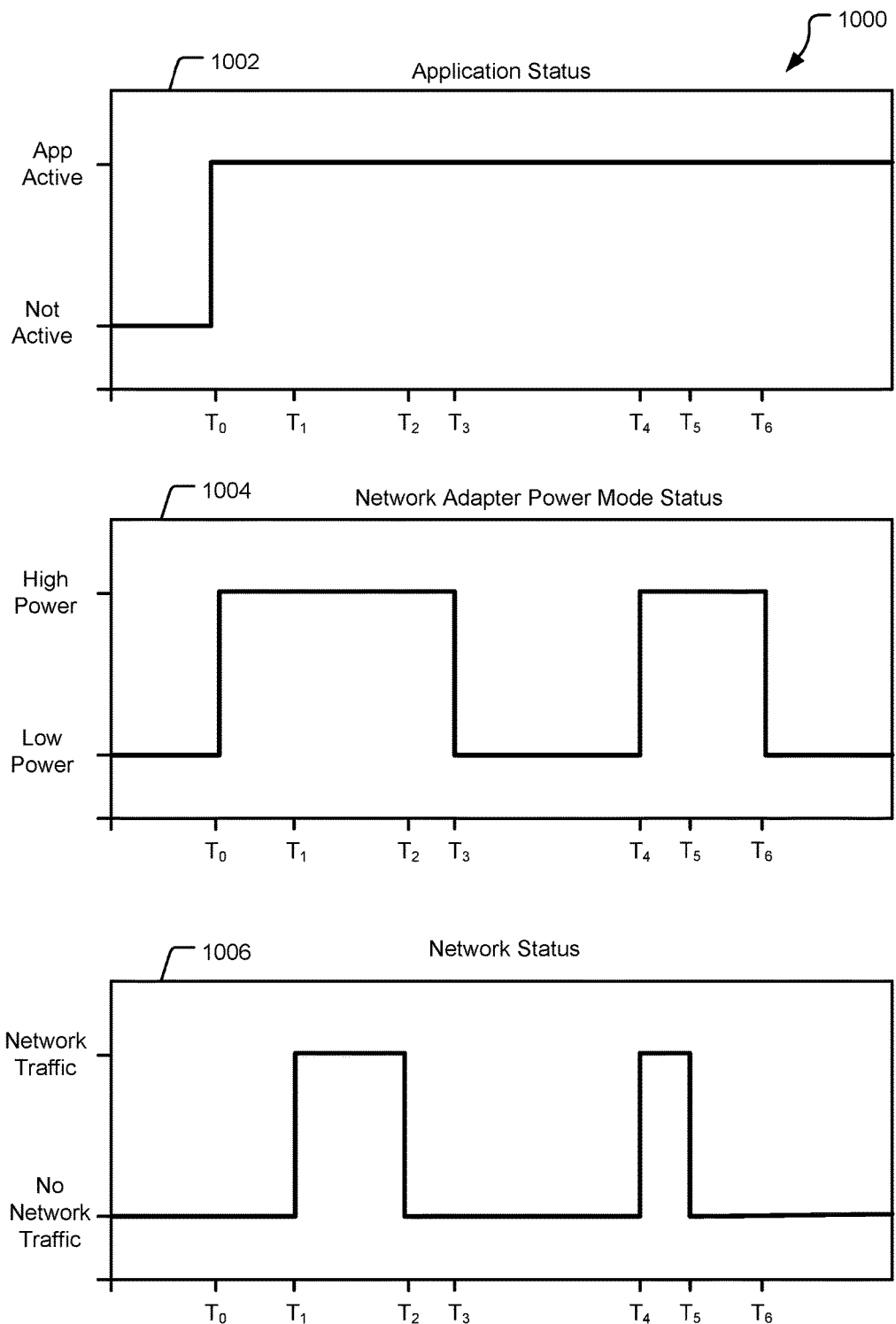
FIG. 10 illustrates plots of example power status of an application, hardware device, and network traffic of a device under supervisory control with usage pattern based control of power management of a device.

FIG. 10 illustrates plots of example power status of an application, hardware device, and network traffic of a device under supervisory control of power management environment 1000. In a first plot 1002, an application is inactive at the beginning of the plot, becomes active at time $T_0$, and remains active for the remainder of the plot. Plot 1004 indicates the power mode status of a hardware component, for example, a network adapter. The network adapter is in a low power mode until time $T_0$ when the application becomes active and requests use of the network adapter. Plot 1006 shows network traffic over the network adapter. Network traffic is present starting at time $T_1$ until time $T_2$. At time $T_2$, network traffic ceases and a timeout period begins for the network adapter. At time $T_3$, the timeout period ends, and the network adapter transitions to a low power state even though the application is still active and may not have de-registered its use of the network adapter. Later, between times $T_4$ and $T_5$, the network becomes active again and the network adapter transitions to a high-power state to service the network traffic. After time $T_5$, the network traffic again ceases and a timeout period begins for the network adapter, which transitions to a low power mode again at time $T_6$ even though the application is still active and may not have de-registered its use of the network adapter.

An example method for power management of an electronic device includes receiving operational information of one or more applications executing on an electronic device, the one or more applications interacting with a hardware component of the electronic device, determining a usage pattern of the hardware component by the one or more applications based on the received operational information, and setting a timeout period associated with the hardware component of the electronic device based on the determined usage pattern, the timeout period defining a minimum amount of time before a power state of the hardware component is permitted to be transitioned from a higher-power state to a lower-power state.

Another example method of any preceding method includes transitioning at least a portion of the hardware component from the higher-power state to the lower-power state after expiration of the timeout period if the hardware component satisfies a transition condition, the transition condition being dependent at least in part on the operational information and the timeout period, and maintaining the hardware component in the higher-power state after expiration of the timeout period if the hardware component does not satisfy the transition condition during the timeout period.

Another example method of any preceding method includes collecting user preference information regarding the hardware component, and adjusting the timeout period associated with the hardware component based on the user preference information.

Another example method of any preceding method includes recording historical activity information of the hardware component, the historical activity information associated with the usage pattern and the timeout period.

Another example method of any preceding method includes wherein the historical activity information includes one of a number of transitions from a higher-power state to a lower-power state, the amount of time the hardware component spends in available power states, the number of transitions from a lower-power state to a higher-power state, user preference information, and an amount of energy consumed by the hardware component.

Another example method of any preceding method includes adjusting the timeout period to different timeout period, recording second historical activity information of the hardware component, the second historical activity information associated with the usage pattern and the different timeout period, comparing the historical activity information to the second historical activity information, and setting the timeout period based on the comparing operation.

Another example method of any preceding method includes setting a wakeup period associated with the hardware component of the electronic device based on the usage pattern, the wakeup period defining a maximum amount of time before a power status of the hardware component may be transitioned from the lower-power state to a different power state, and transitioning a portion of the hardware component from the lower-power state to the different power state after expiration of the wakeup period if the hardware component satisfies a wakeup condition.

Another example method of any preceding method includes recording historical activity information of the hardware component, the historical activity information associated with the usage pattern and the wakeup period, adjusting the wakeup period to different wakeup period, recording second historical activity information of the hardware component, the second historical activity information associated with the usage pattern and the different wakeup period, comparing the historical activity information to the second historical activity information, and setting the wakeup period based on the comparing operation.

An example apparatus includes an operational information receiver configured to receive operational information of one or more applications executing on the electronic device, the one or more applications interacting with a hardware component of the electronic device, a usage pattern module configured to determine a usage pattern of the hardware component by the one or more applications based on the received operational information, and a timeout period selector configured to set a timeout period associated with the hardware component of the electronic device based on the usage pattern, the timeout period defining a minimum amount of time before a power state of the hardware component is transitioned from a higher-power state to a lower-power state.

Another example apparatus of any preceding apparatus includes wherein the adaptive power management control system further includes a power management arbitrator configured to transition at least a portion of the hardware component from the higher-power state to the lower-power state after expiration of the timeout period if the hardware component satisfies a transition condition, the transition condition being dependent at least in part on the operational information and the timeout period, the power management arbitrator further configured to maintain the hardware component in the higher-power state after expiration of the timeout period if the hardware component does not satisfy the transition condition during the timeout period.

Another example apparatus of any preceding apparatus includes wherein the adaptive power management control system further includes a user preference information collector configured to collect user preference information regarding the hardware component, and a timeout period adjustor configured to adjust the timeout period associated with the hardware component based on the user preference information.

Another example apparatus of any preceding apparatus includes wherein the user preference information is collected via a graphical user interface presented to the user.

Another example apparatus of any preceding apparatus includes wherein the graphical user interface is presented to a user when a battery status of the electronic device satisfies a battery status condition.

Another example apparatus of any preceding apparatus includes wherein the graphical user interface presented to the user includes information regarding an effect of a user response to the graphical user interface on the hardware component.

Another example apparatus of any preceding apparatus includes a power management arbitrator configured to transmit the determined usage pattern and at least a portion of the operational information to an aggregated power management arbitrator, the aggregated power management arbitrator being located remotely from the electronic device, the power management arbitrator further configured to receive the timeout period from the aggregated power management arbitrator, the timeout period being based on information collected from other electronic devices.

Figure 11:
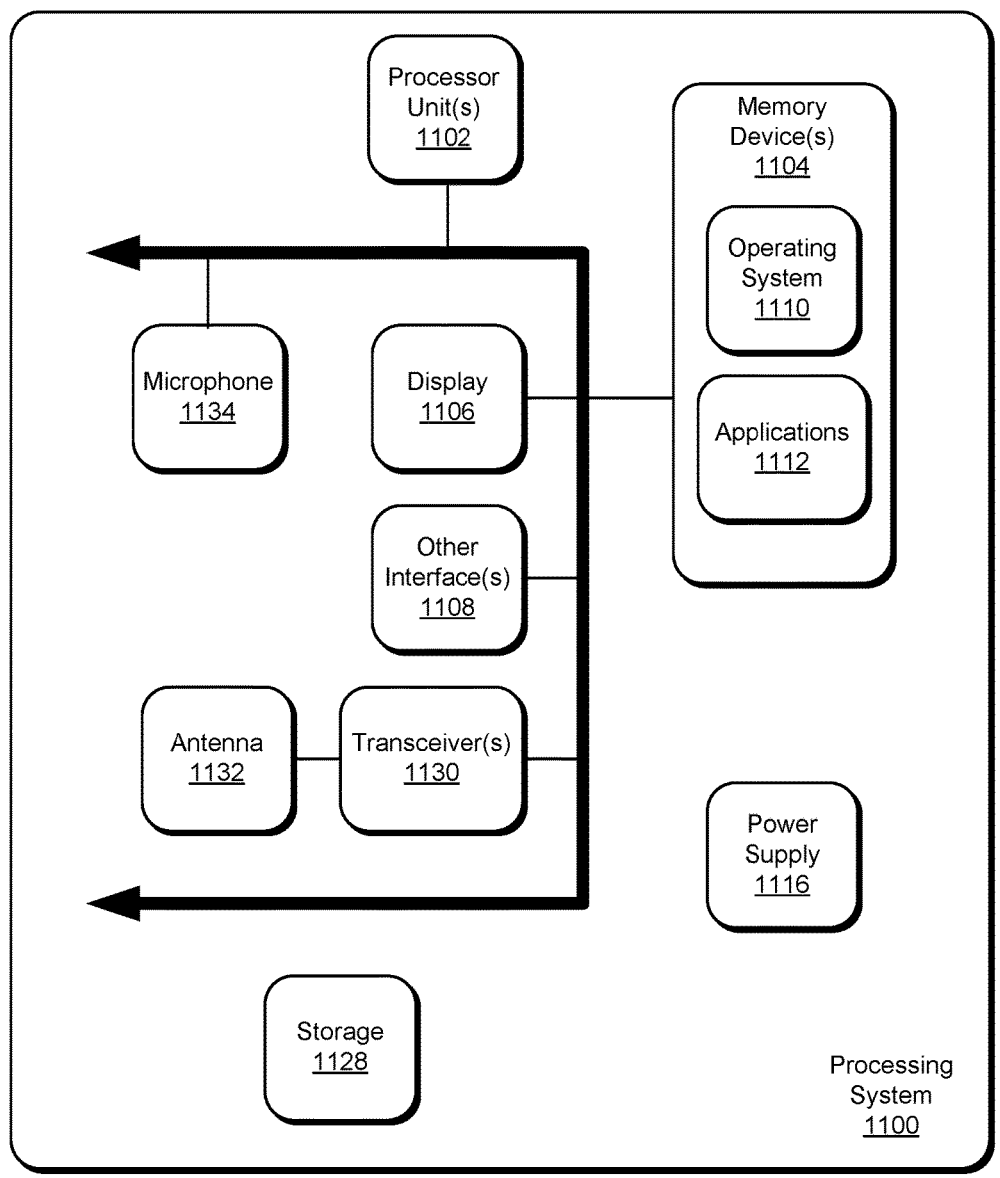
FIG. 11 illustrates an example processing system for use in supervisory control with usage pattern based control of power management.

FIG. 11 illustrates an example processing system 1100 enabled to provide a usage pattern based supervisory control of power management service. The processing system 1100 includes processors 1102 and memory 1104. On memory 1104 is stored the power management supervisory controller, the power management arbitrator, one or more hardware sublayers, and/or one or more hardware drivers. The processing system may include one or more hardware devices, boxes, or racks, and may be hosted in a network data center.

According to various non-limiting examples, the computing systems described herein includes one or more devices, such as servers, storage devices, tablet computers, laptops, desktop computers, gaming consoles, media players, mobile phones, handheld computers, wearable devices, smart appliances, networking equipment, kiosk devices, and so forth. In one example configuration, the computing systems comprise at least one processor. The computing systems also contain communication connection(s) that allow communications with various other systems. The computing systems also include one or more input devices, such as a keyboard, mouse, pen, voice input device, touch input device, etc., and one or more output devices, such as a display (including a touch-screen display), speakers, printer, etc. coupled communicatively to the processor(s) and computer-readable media via connections such as a bus.

The memory 1104 is an example of computer-readable media. Computer-readable media stores computer-executable instructions that are loadable and executable by one or more processor(s), as well as data generated during execution of, and/or usable in conjunction with, these programs. In the illustrated example, computer-readable media stores OS instances, which provide basic system functionality to applications. One or more of these components, including the operating systems, may be instantiated as virtual machines, application containers, or as some other type of virtualized instantiation.

Processor(s) 1102 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media (e.g., memory 1104) include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), Resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or another transmission mechanism. As defined herein, computer storage media does not include communication media.

Various processes described herein are carried out as computing functions in conjunction with networking functions. For example, one computing device or system may cause transmission of a message to another computing device via network communication hardware. This may include, for example, passing by a software module a pointer, argument, or other data to a networking module. The pointer, argument or other data may identify data stored in memory or in a register that is to be transmitted to another computing device. The networking module may include a protocol stack and may read the data identified by the pointer, argument, or other data. The protocol stack may encapsulate the data in one or more frames, packets, cells, or other data networking protocol structures. The protocol stack (such as within the network power module or elsewhere) may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver or network adapter. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

The processing system 1100 may also include a display 1106 (e.g., a touchscreen display, an OLED display with photodetectors, etc.), and other interfaces 1108 (e.g., a keyboard interface). The memory device 1104 generally includes both volatile memory (e.g., RAM) and non-volatile memory (e.g., flash memory). An OS 1110, such as one of the varieties of the Microsoft Windows® operating system, resides in the memory device 1104 and is executed by at least one of the processor units 1102, although it should be understood that other operating systems may be employed. Other features of the processing system 1100 may include without limitation an image sensor, a sensing trigger (e.g., a pressure sensor or a proximity sensor), etc.

One or more applications 1112, such as power management software, power management user preference software, hardware power mode control software, etc., are loaded in the memory device 1104 and executed on the OS 1110 by at least one of the processor units 1102. The processing system 1100 includes a power supply 1116, which is powered by one or more batteries and/or other power sources and which provides power to other components of the processing system 1100. The power supply 1116 may also be connected to an external power source that overrides or recharges the built-in batteries or other power sources.

The processing system 1100 includes one or more communication transceivers 1130 to provide network connectivity (e.g., mobile phone network, Wi-Fi®, BlueTooth®, etc.). The processing system 1100 also includes various other components, such as a positioning system 1120 (e.g., a global positioning satellite transceiver), one or more accelerometers 1122, one or more cameras 1124, one or more audio interfaces 1134 (e.g., such a microphone, an audio amplifier and speaker and/or audio jack), one or more antennas 1132, and additional storage 1128. Other configurations may also be employed.

In an example implementation, a mobile operating system, various applications, modules for power management and device control (e.g., drivers, communication stack layers and/or sublayers), and other modules and services may be embodied by instructions stored in the memory device 1104 and/or storage devices 1128 and processed by the processing unit 1102. Timeout periods, wakeup periods, and other data may be stored in the memory device 1104 and/or storage devices 1128 as persistent data stores.

The processing system 1100 may include a variety of tangible processor-readable storage media and intangible processor-readable communication signals. Tangible processor-readable storage can be embodied by any available media that can be accessed by the processing system 1100 and includes both volatile and nonvolatile storage media, removable and non-removable storage media. Tangible processor-readable storage media excludes intangible communication signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1100. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, OS software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a processor, cause the processor to perform methods and/or operations in accordance with the described implementations. The executable processor program instructions may include any suitable type of code, such as source code, compiled code, interpreted code, executable code, static code, dynamic code, and the like. The executable processor program instructions may be implemented according to a predefined processor language, manner or syntax, for instructing a processor to perform a certain operation segment. The instructions may be implemented using any suitable high-level, low-level, object-oriented, visual, compiled and/or interpreted programming language.

The implementations described herein are implemented as logical steps in one or more processor systems. The logical operations may be implemented (1) as a sequence of processor-implemented steps executing in one or more processor systems and (2) as interconnected machine or circuit modules within one or more processor systems. The implementation is a matter of choice, dependent on the performance requirements of the processor system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. An adaptive power management method for power management of an electronic device, the adaptive power management method comprising:

collecting historical activity information for a hardware component of the electronic device;

collecting historical operational information for a plurality of applications executing on the electronic device and interacting with the hardware component;

analyzing the collected historical activity information and the collected historical operational information to identify multiple usage patterns for the hardware component, each usage pattern being characterized by a usage profile of the hardware component stored in associated with operational information for one or more of the plurality of applications collected during a time interval corresponding to the usage profile;

receiving operational information of one or more of the plurality of applications executing on the electronic device, the one or more applications interacting with the hardware component of the electronic device;

selecting one of the multiple identified usage patterns of the hardware component based on the received operational information from the one or more of the plurality of applications and activity information for a hardware component;

setting a timeout period associated with the hardware component of the electronic device based on the selected usage pattern, the timeout period defining a minimum amount of time before a power state of the hardware component is permitted to be transitioned from a higher-power state to a lower-power state; and transitioning at least a portion of the hardware component from the higher-power state to the lower-power state after expiration of the timeout period if the hardware component satisfies a transition condition, the transition condition being dependent at least in part on the operational information and the timeout period.

2. The adaptive power management method of claim 1, further comprising:

maintaining the hardware component in the higher-power state after expiration of the timeout period if the hardware component does not satisfy the transition condition during the timeout period.

3. The adaptive power management method of claim 1, further comprising:

collecting user preference information regarding the hardware component; and adjusting the timeout period associated with the hardware component based on the user preference information.

4. The adaptive power management method of claim 1, wherein collecting the historical activity information for the hardware component further comprises:

recording first activity information of the hardware component, the first activity information associated with the selected usage pattern and the timeout period.

5. The adaptive power management method of claim 4, wherein the first activity information includes one of a number of transitions from a higher-power state to a lower-power state, the amount of time the hardware component spends in available power states, the number of transitions from a lower-power state to a higher-power state, user preference information, and an amount of energy consumed by the hardware component.

6. The adaptive power management method of claim 4, further comprising:

adjusting the timeout period to a different timeout period, wherein collecting the historical activity information of the hardware component further comprises:

recording second activity information of the hardware component, the second activity information associated with the usage pattern and the different timeout period;

comparing the first activity information to the second activity information; and setting the timeout period based on the comparing operation.

7. The adaptive power management method of claim 1, further comprising:

setting a wakeup period associated with the hardware component of the electronic device based on the usage pattern, the wakeup period defining a maximum amount of time before a power status of the hardware component may be transitioned from the lower-power state to a different power state; and transitioning a portion of the hardware component from the lower-power state to the different power state after expiration of the wakeup period if the hardware component satisfies a wakeup condition.

8. The adaptive power management method of claim 7, wherein the collected first activity information of the hardware component is associated with the selected usage pattern and the wakeup period and the adaptive power management method further comprises:

recording historical activity information of the hardware component, the historical activity information associated with the usage pattern and the wakeup period;

adjusting the wakeup period to different wakeup period;

recording second activity information of the hardware component, the second activity information associated with the usage pattern and the different wakeup period;

comparing the first activity information to the second activity information; and setting the wakeup period based on the comparing operation.

9. The adaptive power management method of claim 1, wherein selecting one of the multiple identified usage patterns further comprises:

selecting one of the identified usage patterns responsive to registration of an application with an operation system to use the hardware component.

10. An adaptive power management control system for an electronic device, the adaptive power management control system including:

an operational information receiver configured to:

collect historical activity information of a hardware component of the electronic device;

collect historical operational information for a plurality of applications executing on the electronic device and interacting with the hardware component;

analyze the collected historical activity information and the collected historical operational information to identify multiple usage patterns of the hardware component, each usage pattern being characterized by a usage profile of the hardware component stored in association with operational information for one or more of the plurality of applications collected during a time interval corresponding to the usage profile; and receive operational information of one or more of the plurality of applications executing on the electronic device, the one or more applications interacting with the hardware component of the electronic device; and a usage pattern module configured to:

select one of the multiple identified usage patterns of the hardware component based on the received operational information from the one or more of the plurality of applications and activity information for a hardware component; and a timeout period selector configured to set a timeout period associated with the hardware component of the electronic device based on the selected usage pattern, the timeout period defining a minimum amount of time before a power state of the hardware component is transitioned from a higher-power state to a lower-power state.

11. The adaptive power management control system of claim 10, wherein the adaptive power management control system further includes:

a power management arbitrator configured to transition at least a portion of the hardware component from the higher-power state to the lower-power state after expiration of the timeout period if the hardware component satisfies a transition condition, the transition condition being dependent at least in part on the operational information and the timeout period, the power management arbitrator further configured to maintain the hardware component in the higher-power state after expiration of the timeout period if the hardware component does not satisfy the transition condition during the timeout period.

12. The adaptive power management control system of claim 10, wherein the adaptive power management control system further includes:

a user preference information collector configured to collect user preference information regarding the hardware component; and a timeout period adjustor configured to adjust the timeout period associated with the hardware component based on the user preference information.

13. The adaptive power management control system of claim 12, wherein the user preference information is collected via a graphical user interface presented to the user.

14. The adaptive power management control system of claim 13, wherein the graphical user interface is presented to a user when a battery status of the electronic device satisfies a battery status condition.

15. The adaptive power management control system of claim 13, wherein the graphical user interface presented to the user includes information regarding an effect of a user response to the graphical user interface on the hardware component.

16. The adaptive power management control system of claim 10, further comprising:
a power management arbitrator configured to transmit the determined usage pattern and at least a portion of the operational information to an aggregated power management arbitrator, the aggregated power management arbitrator being located remotely from the electronic device, the power management arbitrator further configured to receive the timeout period from the aggregated power management arbitrator, the timeout period being based on information collected from other electronic devices.

17. One or more tangible processor-readable storage media embodied with instructions for executing on one or more processors and circuits of a device a process for adaptive power management of an electronic device, the process comprising:
collecting historical activity information of a hardware component of the electronic device;
collecting historical operational information for a plurality of applications executing on the electronic device and interacting with the hardware component;
analyzing the collected historical activity information and the collected historical operational information to identify multiple usage patterns of the hardware component, each usage pattern being characterized by a usage profile of the hardware component stored in association with operational information for one or more of the plurality of applications collected during a time interval corresponding to the usage profile; and
receiving operational information of one or more of the plurality of applications executing on the electronic device, the one or more applications interacting with the hardware component of the electronic device;
selecting one of the multiple identified usage patterns of the hardware component based on the received operational information from the one or more of the plurality of application and activity information for the hardware components; and
setting a timeout period associated with the hardware component of the electronic device based on the selected usage pattern, the timeout period defining a minimum amount of time before a power state of the hardware component is transitioned from a higher-power state to a lower-power state.

18. The one or more tangible processor-readable storage media of claim 17, wherein the process further comprises:
transitioning at least a portion of the hardware component from the higher-power state to the lower-power state after expiration of the timeout period if the hardware component satisfies a transition condition, the transition condition being dependent at least in part on the operational information and the timeout period; and
maintaining the hardware component in the higher-power state after expiration of the timeout period if the hardware component does not satisfy the transition condition during the timeout period.

19. The one or more tangible processor-readable storage media of claim 17, further comprising:
collecting user preference information regarding the hardware component; and
adjusting the timeout period associated with the hardware component based on the user preference information.

20. The one or more tangible processor-readable storage media of claim 17, wherein collecting the historical activity information for the hardware component further comprises:
recording first activity information of the hardware component, the first activity information associated with the usage pattern and the timeout period;
adjusting the timeout period to different timeout period;
recording second activity information of the hardware component, the second activity information associated with the usage pattern and the different timeout period;
comparing the first activity information to the second activity information; and
setting the timeout period based on the comparing operation.

21. The one or more tangible processor-readable storage media of claim 17, further comprising:
setting a wakeup period associated with the hardware component of the electronic device based on the usage pattern, the wakeup period defining a maximum amount of time before a power status of the hardware component may be transitioned from the lower-power state to a different power state; and
transitioning the portion of the hardware component from a lower-power state to the different power state after expiration of the wakeup period if the hardware component satisfies a wakeup condition.

* * * * *